(12) United States Patent
Wilson et al.

(10) Patent No.: US 7,480,807 B2
(45) Date of Patent: Jan. 20, 2009

(54) DATA STORAGE SYSTEM

(75) Inventors: Kirk Donald Wilson, Lakewood, CO (US); Noritada Kuwayama, Kiyose (JP)

(73) Assignee: Asaca Corporation, Tokyo (JP)

( * ) Notice: Subject to any disclaimer, the term of this patent is extended or adjusted under 35 U.S.C. 154(b) by 542 days.

(21) Appl. No.: 10/502,457

(22) PCT Filed: Feb. 4, 2003

(86) PCT No.: PCT/US03/03357

§ 371 (c)(1),
(2), (4) Date: Jul. 22, 2004

(87) PCT Pub. No.: WO03/067385

PCT Pub. Date: Aug. 14, 2003

(65) Prior Publication Data

US 2005/0055601 A1    Mar. 10, 2005

Related U.S. Application Data

(60) Provisional application No. 60/426,943, filed on Nov. 14, 2002, provisional application No. 60/354,665, filed on Feb. 5, 2002.

(51) Int. Cl.
*G06F 1/00* (2006.01)
*G06F 12/00* (2006.01)

(52) U.S. Cl. .................. 713/300; 713/323; 711/1; 711/6; 711/100; 711/114; 711/154; 361/600; 361/685

(58) Field of Classification Search ............. 713/300, 713/323; 711/1, 6, 100, 114, 154; 361/600, 361/685
See application file for complete search history.

(56) References Cited

U.S. PATENT DOCUMENTS 4,754,397 A      6/1988   Varaiya et al.
5,379,184 A *    1/1995   Barraza et al. ............ 361/685

(Continued)

FOREIGN PATENT DOCUMENTS

EP         0508441          10/1992

(Continued)

OTHER PUBLICATIONS

International Search Report for PCT/US03/03357, mailed Mar. 24, 2004, ISA/US.

*Primary Examiner*—Abdelmoniem Elamin
(74) *Attorney, Agent, or Firm*—Harness, Dickey & Pierce, PLC

(57) ABSTRACT

An memory device (HDD) storage system (10) has at least one storing location (16) in which an memory device (18) is received while the memory device is not supplied with an electric power, at least one docking location (22) where the memory device is supplied with the electric power so that data can be stored in the memory device and retrieved from the memory device, and a transport device (30) for transporting the memory device between the shelf (16) and the docking location (22). Alternatively, a switching controller (110) connects a system controller (26) and also a power source (118) to an immovably secured memory device (18).

5 Claims, 21 Drawing Sheets

U.S. PATENT DOCUMENTS

| | | |
|---|---|---|
| 5,463,742 A | 10/1995 | Kobayashi |
| 5,721,835 A | 2/1998 | Niwa et al. |
| 5,900,007 A | 5/1999 | Nunnelley et al. |
| 6,005,368 A | 12/1999 | Frame |
| 6,016,530 A | 1/2000 | Auclair et al. |
| 6,122,173 A * | 9/2000 | Felcman et al. ............. 361/726 |
| 6,138,194 A * | 10/2000 | Klein et al. ................. 710/302 |
| 6,193,339 B1 * | 2/2001 | Behl et al. ............... 312/223.2 |
| 7,039,299 B2 * | 5/2006 | Onodera ..................... 385/125 |
| 2003/0063431 A1 * | 4/2003 | Sobolewski ................. 361/600 |
| 2006/0056150 A1 * | 3/2006 | Behl et al. .................. 361/687 |

FOREIGN PATENT DOCUMENTS

| | | |
|---|---|---|
| EP | 1235222 A2 | 8/2002 |
| WO | 95-13582 | 5/1995 |

* cited by examiner

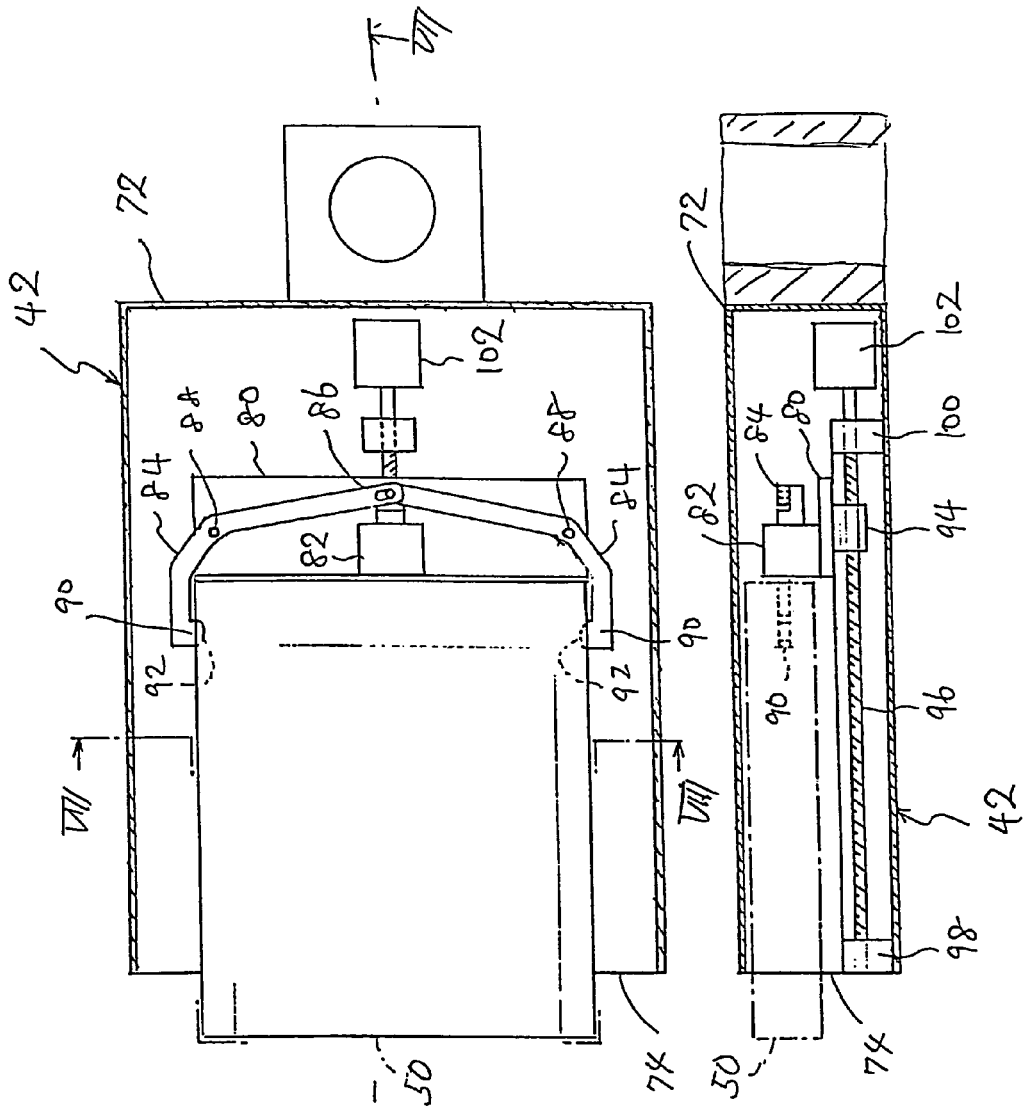
Fig. 6
Fig. 7
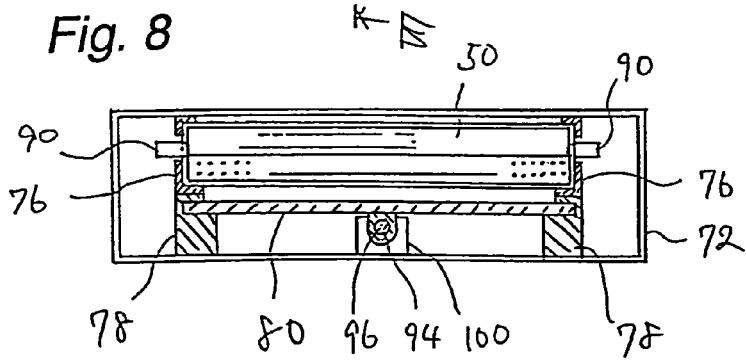
Fig. 8

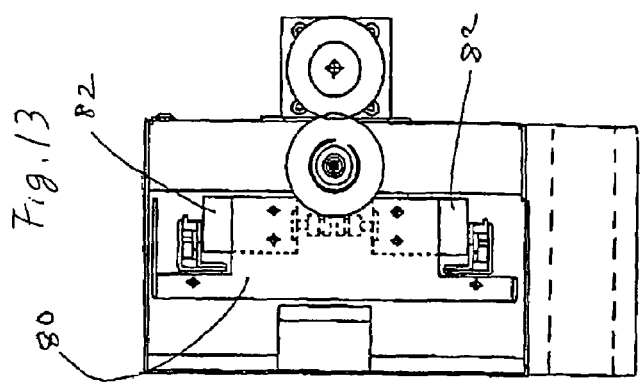
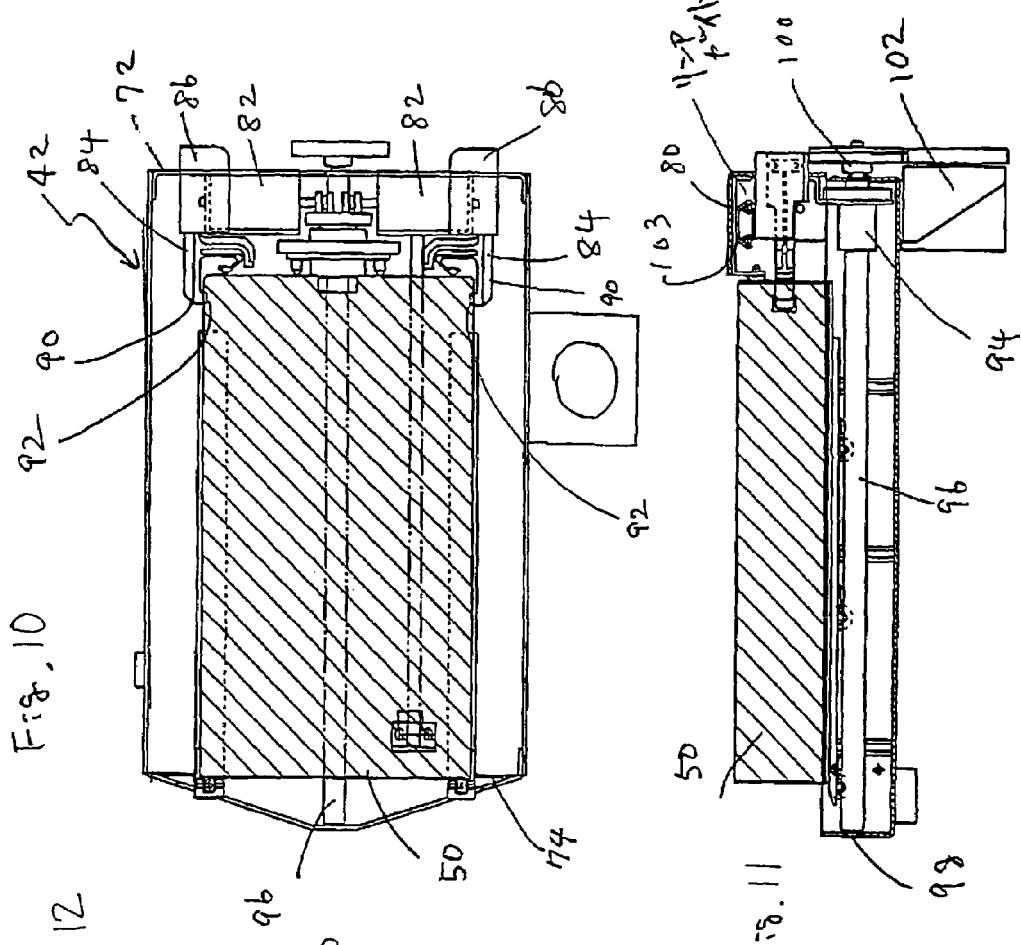
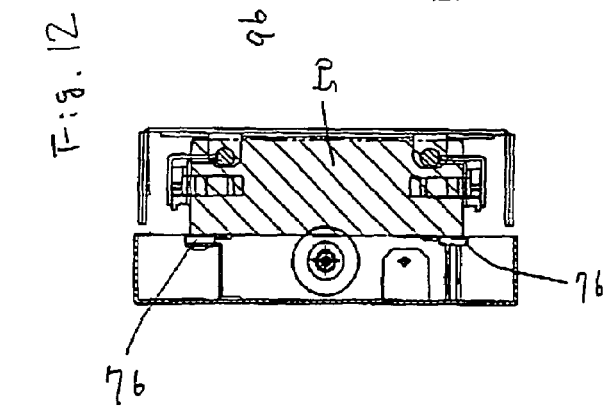

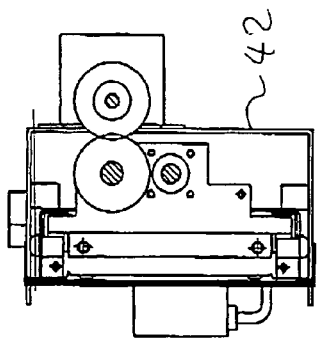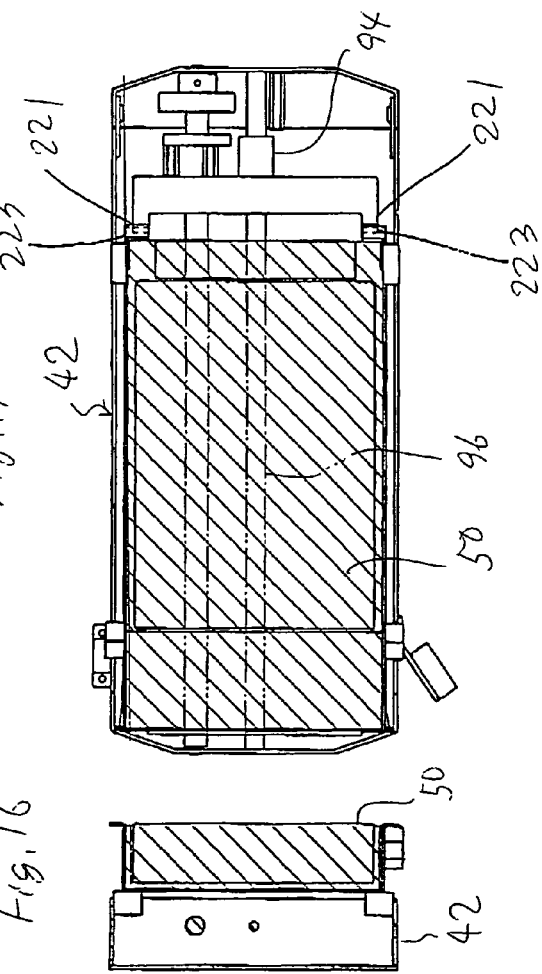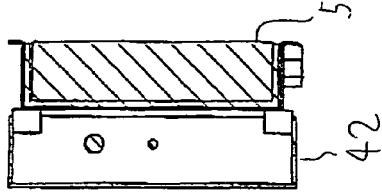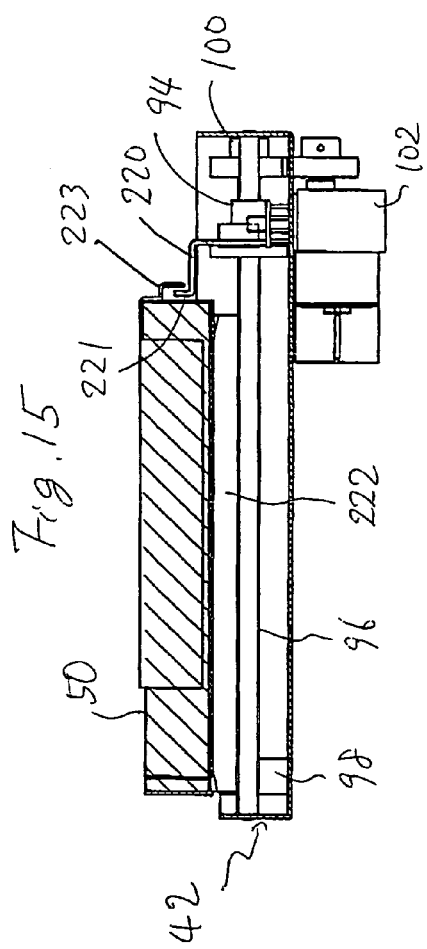

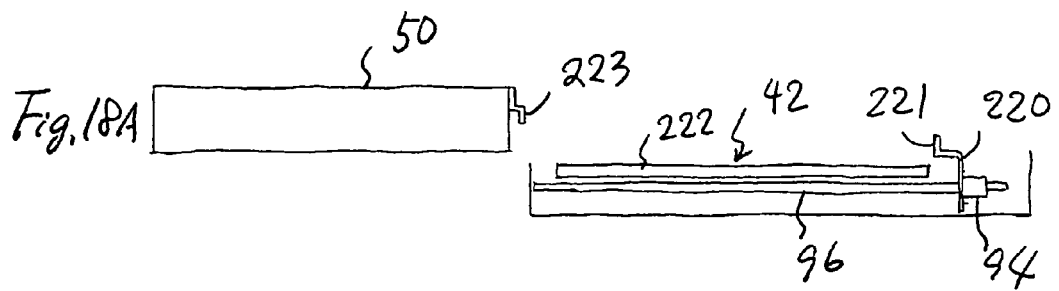
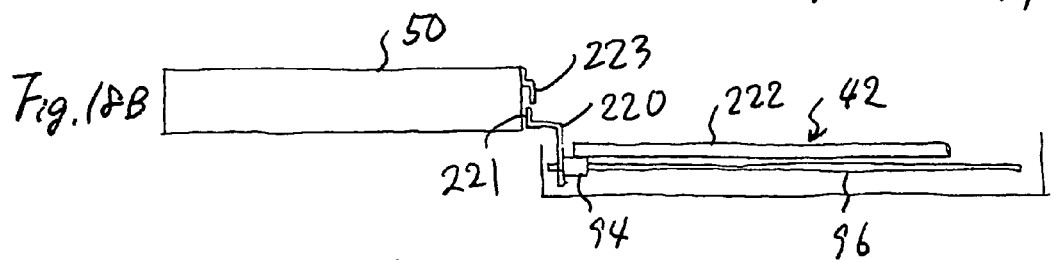
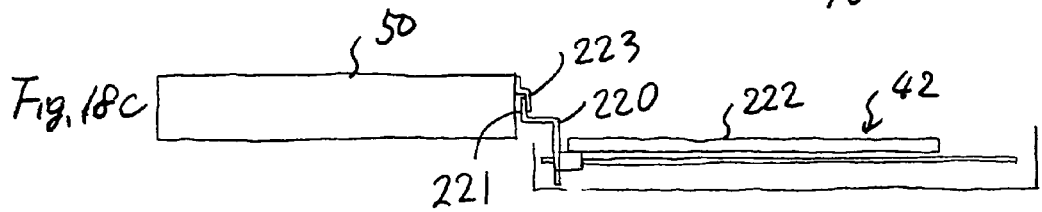
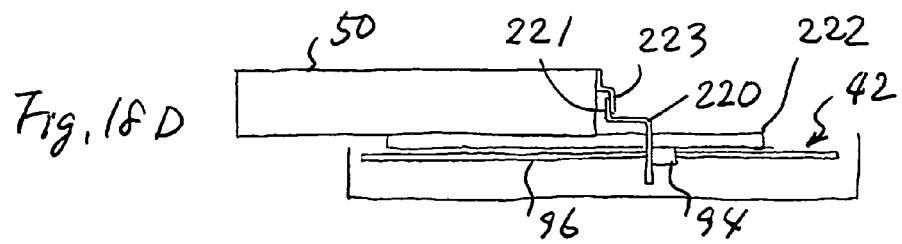
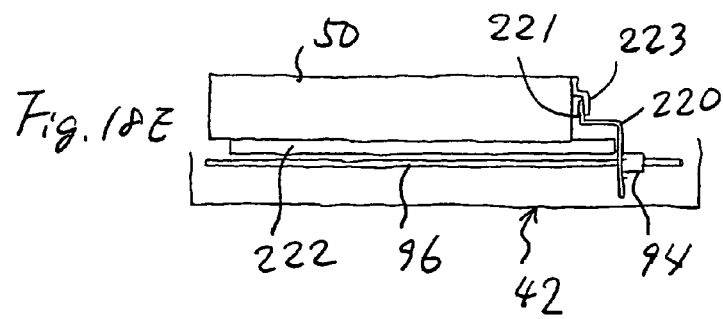

DATA STORAGE SYSTEM

FIELD OF THE INVENTION

The present invention relates to a data storage system. In particular, the present invention relates to a data storage system having a number of memory devices such as HDD (Hard Disk Drive) and nonvolatile memory in which each memory device is automatically transported as required between a de-energized storage location and an energized storage docking location. Also, the present invention relates to an HDD storage system having a number of memory devices secured in a housing, in which one or more memory devices are selectively supplied with an electric power and then driven as required.

BACKGROUND OF THE INVENTION

Conventionally, there have been proposed a variety of data storage systems each incorporating a number of HDDs as data storage elements rather than tapes, for example, from Sun Microsystems Inc., 901 San Antonio Road, Palo Alto, Ga. 94~03 USA, under the tradename Sun StorEdge 9900 series. According to the HDD data storage system, each HDD fixed and arranged in a shelf equipped in a cabinet is always powered so that data can immediately be written in and retrieved from the HDD in response to data input and output instruction, respectively.

Disadvantageously, this consumes a great deal of electric power. Also, an electric fan must be prepared for the dissipation of heat generated from HDDs and thereby to maintain a constant temperature within an interior of the cabinet. Further, the necessity of supplying electric power to all of the HDDs will invite an excessive enlargement of UPS (Uninterruptible Power Supply)—Furthermore, a service life of HDD is shortened because a power is constantly supplied thereto regardless of data I/O usage, resulting in frequent replacement of storage elements. Moreover, a requirement for HDD to be used as a storage element to a host computer needs an associated interface channel and uninterrupted connection, limiting the total number of storage elements and overall capacity any single host can connect with.

SUMMARY OF THE INVENTION

Accordingly, a data storage system (10) according 20 to one embodiment of the present invention has at least one storage location (16) in which a memory device such as EDD (18) and nonvolatile memory is received while the memory device is not supplied with electric power, at least one docking location (22) where the memory device is supplied with the electric power so that data can be stored in the memory device and retrieved from the memory device, and a transport device (30) for transporting the memory device between the shelf (16) and the docking location (22).

In another embodiment of the present invention, a 5 data storage system has one or more memory devices such as HDD (18) and nonvolatile memory, a system controller (26) each connected with the memory devices through respective first switches (112, 114), a power source (118) each connected with the memory devices through respective second switches (1L6, 118) and a switching controller (110) for switching on and off the first and second switches.

BRIEF DESCRIPTION OF THE DRAWINGS

For a further understanding of the nature, 15 objects and advantages of the present invention, reference should be had to the following detailed description, read in conjunction with the following drawings, wherein like reference numerals denote like elements and wherein:

FIG. 6 is a cut-away plan view of the handler;

FIG. 7 is a horizontal cross sectional view of the handler, taken along lines VII-VII in FIG. 6;

FIG. 8 is another cross sectional view of the handler, taken along lines VIIT-VIII in FIG. 6;

FIGS. 10 to 13 are plan view, side elevational 15 view, front view and rear view of the handler according to the another embodiment and the container supported by the handler;

FIGS. 14 to 17 are plan view, side elevational view, front view and rear view of the handler according to the another embodiment and the container supported by the handler;

FIGS. 18A to 18E are schematic side elevational views showing an operation for the transfer of the container between the handler and the shelf/SDL;

DETAILED DESCRIPTION OF THE PREFERRED EMBODIMENTS

With reference to the drawings, specific embodiments of the storage system according to the present invention will be described hereinafter.

I. Robotically Assisted Disc System

Figure 1:
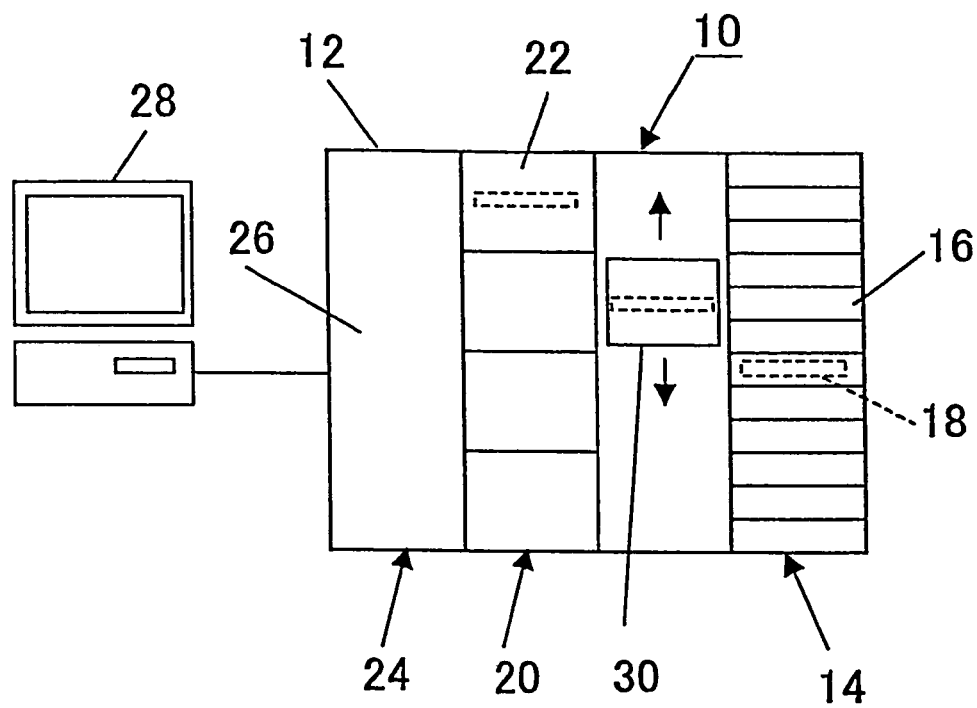
FIG. 1 is a schematic side elevational view of a 20 data storage system of the present invention.
Figure 2:
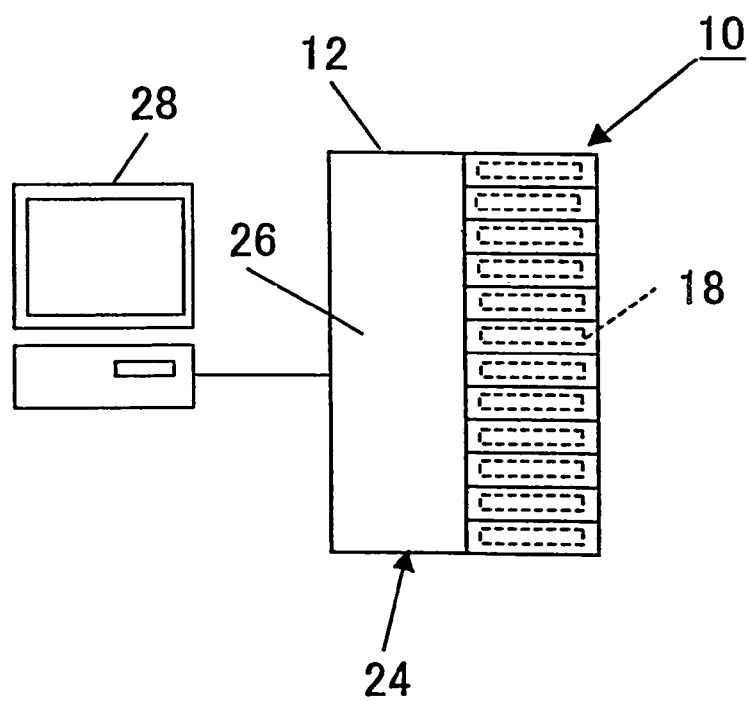
FIG. 2 is a schematic side elevational view of the data storage system which is virtually recognized by a server system.

Referring first to FIG. 1, there is shown a robotically assisted disk (RAD) system or data storage system generally indicated by reference numeral 10. RAD system 10 has a frame or cabinet 12. The cabinet 12 includes a data storage station 14. The data storage station 14 has a number of storage shelves 16 or storing locations in each of which a storage element (SE), i.e., memory device 18 such as HDD is received while it is electrically disconnected from a power supply not shown. It should be noted that HDD is mainly used for the memory device 18 in the following descriptions, however; it may be replaced with a nonvolatile memory. The cabinet 12 also includes a centralized interface area or drive station 20 having at least one storage docking location (SDL) 22. SDL 22 is designed to receive and thereby electrically energize the memory device 18 so that data can be recorded therein and retrieved therefrom as required. A control station 24 has a system controller 26 for powering the memory device 18 in SDL 22, thereby recording data into the memory device 18 received in SDL 22 and retrieving the same therefrom in response to a request from a server system 28. In order to transport each memory device 18 between the storage shelf 16 of storage station 14 and SDL 22 of drive station 20, a pick and place mechanism 30 is provided in the cabinet 12, which will be described in detail later.

Conventionally, various HDDs different in disk-size or the number of interface pins are commercially available. For example, according to the diameter of hard disk received in HDD, they can be classified as 5.25-inch and 3.5-inch disks, for example. For example, HDD commercially available from IBM under the trade name of Ultra 160 or Ultra 320 Models (68 pin model) has an outline generally indicated in FIG. 4. This 68 pin model has a 68-pin connector, power connector, and auxiliary connector. Therefore, a single model of HDD is preferably used for the RAD system 10. However, as shown in FIG. 1 plural SDLs 22 may be mounted in RAD system 10 for handling various types of HDDs, or multiple HDD's of the same type simultaneously.

Referring back to FIG. 1, the server system 28 is connected to the system controller 24 through fibre channels, SCSI, TCP/IP network or other host interface, for example. For causing the server system 28 to control RAD system 10, the server system 28 is installed with necessary applications or softwares including a suitable operating system such as MS Windows or Linux. Another applications installed in the servers are those required for controlling a number of memory devices, including "Zfs" available from NTT-IT Corporation in Japan, "AMASS" Virtual from Advanced Digital Information Corporation, or "MagnaVault" from BakBone Software Inc.

Such software causes the server system 28 to recognize the FAD system to be seen as one or more large memory devices actually consisting of a multiplicity of memory devices 18 not only received in SDL 22 but also stored in the storage shelf 16 as logically and electrically connected to the system controller 26.

Figure 3:
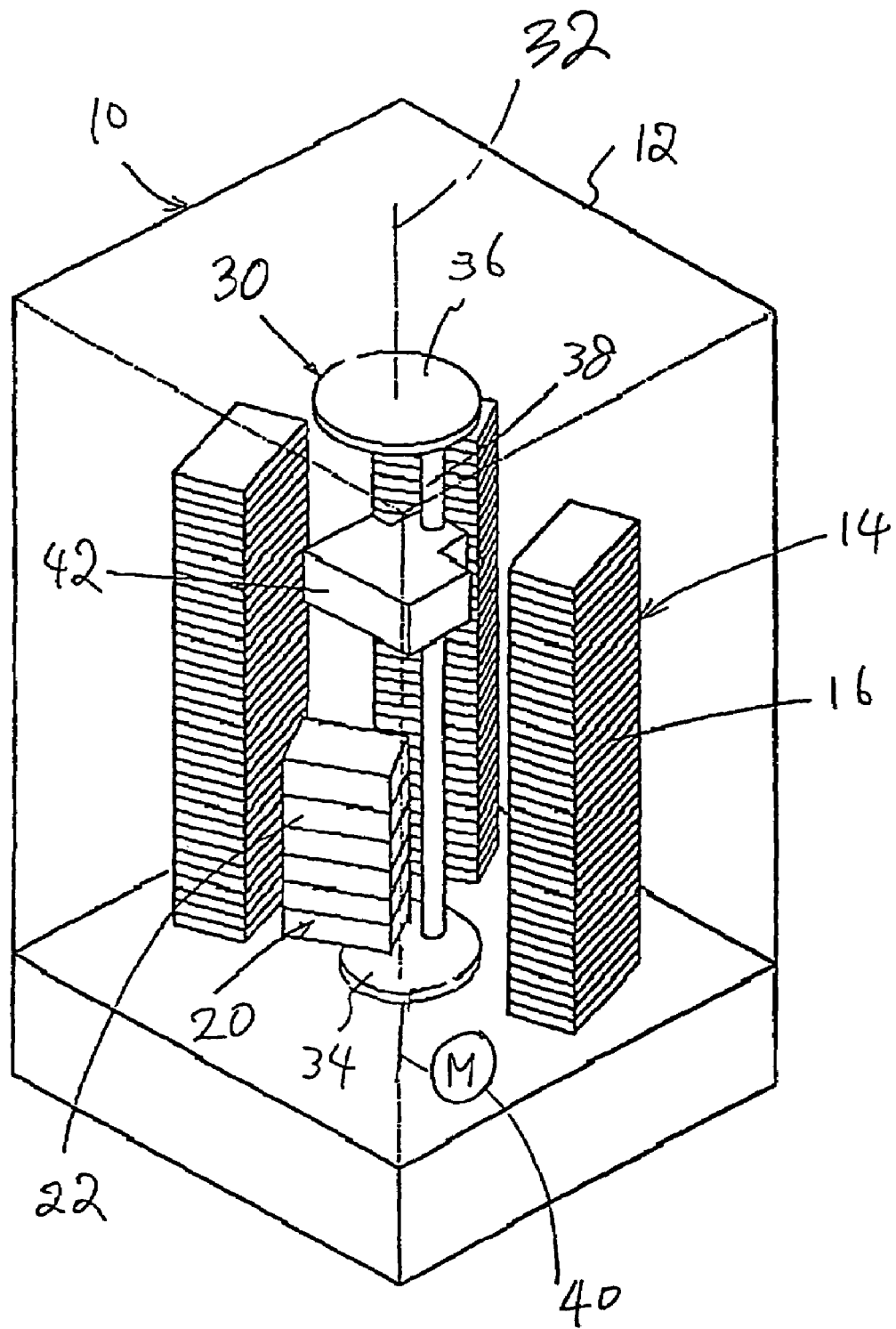
FIG. 3 is a perspective view of a transport 25 mechanism in the storage system in FIG. 1.

FIG. 3 shows a specific mechanical structure of RAD system 10. In this drawing, the pick and place mechanism 30 has a vertical axis 32 about which lower and upper plates 34 and 36 are rotatably supported. The lower and upper plates 34 and 36 are coupled by a vertical rod 38 positioned eccentrically with respect to the rotational axis 32. Also, the lower plate 34 is drivingly connected to a motor 40 so that, when the motor 40 is energized, the vertical rod 38 orbits around the vertical axis 32. The pick and place mechanism 30 further includes a transport device or handler 42 for the transportation of memory device between the storage shelf (SS) 16 and the drive station SDL 22. The handler 42 is drivingly connected to a motor mounted therein (not shown) so that, when the motor is energized, the transport device moves vertically up or down on shaft 32. Provided around the pick and place mechanism 30 are plural memory device storage stations 14 and the docking station 20. In this embodiment, three storage stations 14 and one drive station 20 are arranged at regular intervals about the pick and place mechanism 30. Each storage station 14 has a number of storage shelves 16 for supporting memory devices. The drive station 20 has a plurality of SDLs 22.

Figure 4:
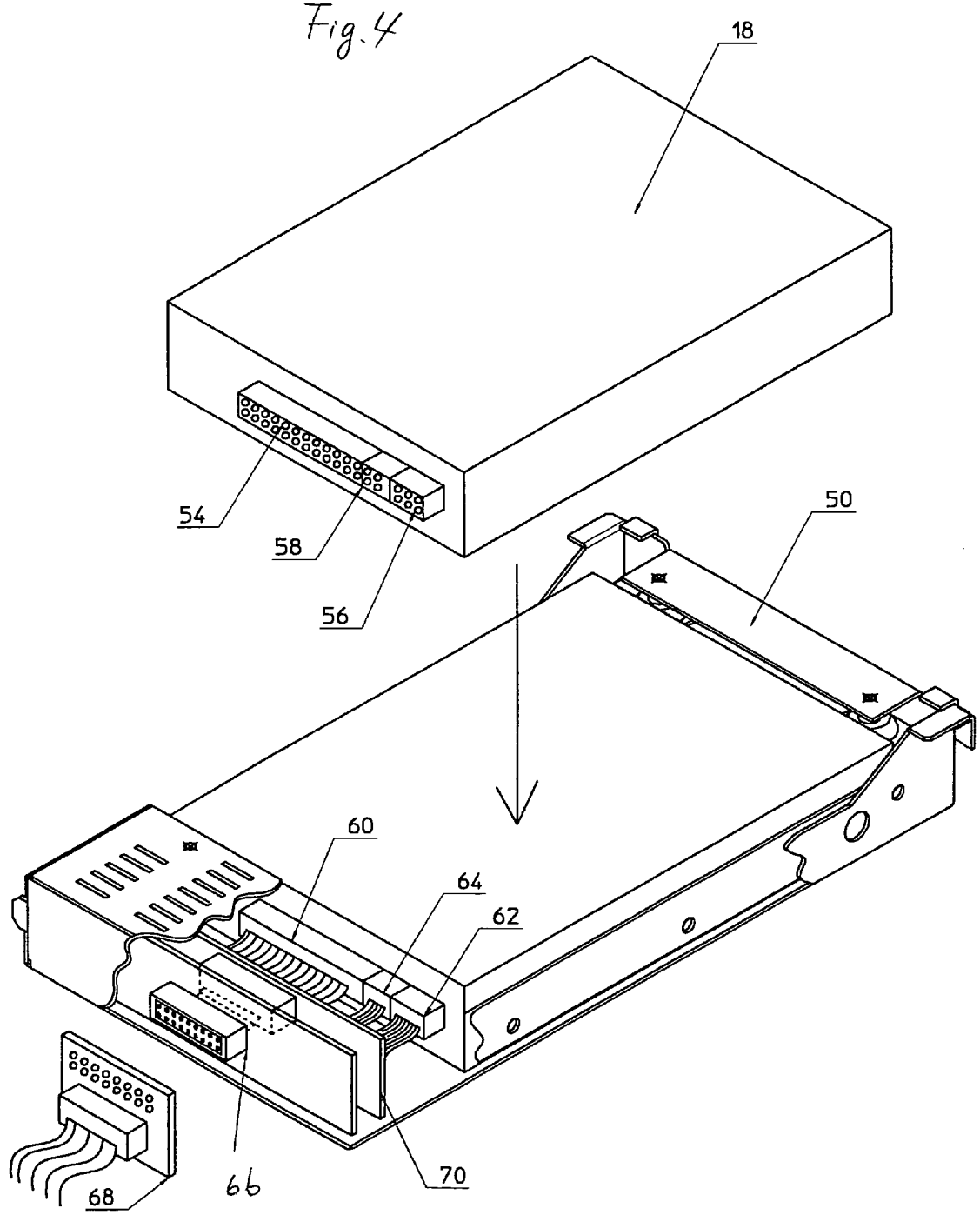
FIG. 4 is a perspective view of an HDD and its container.
Figure 5:
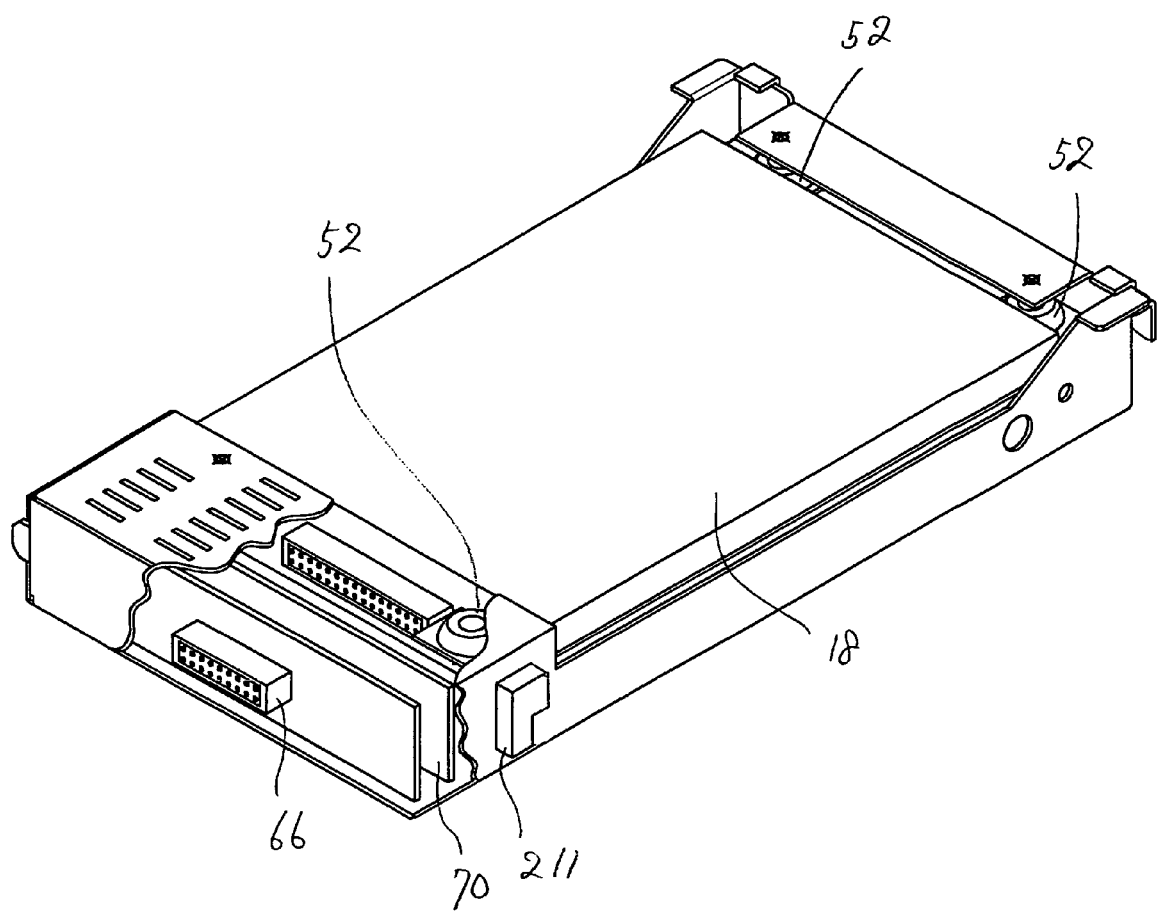
FIG. 5 is a cross sectional view of the container in which HDD is received.

As described above, each memory device is connected to and disconnected from SDL as required. Disadvantageously, the repetitional connection and disconnection will damage connector pins of the memory device, which in turn reduces its service duration down to a great extent. Therefore, to prevent the connector pins from being damaged at the connection and disconnection with SDL 22, a various improvements have been provided to the memory device. For example, as shown in FIGS. 4 and 5 the memory device 18 is received in a container 50. The container 50 may have a specific size depending upon the type or size of the memory device to be received. For reducing shocks that FIDD would be subject at its connection and disconnection, a plurality of elastic members such as sponge elements 52 are provided between the container 50 and the memory device 18.

As described above with reference to FIGS. 4 and 5, the memory device 18 has a SCSI, ATAPI, or Serial ATA plug 54, power plug 56 and auxiliary plug 58, for example.

Corresponding to those three types of plugs, the container 50 includes three sockets 60, 62 and 64 capable of being connected to the plugs 54, 56 and 58 and thereby defining connectors therewith, respectively. The plugs 54, 56 and 58 and associated sockets 60, 62 and 64 are connected to each other when the memory device 18 is installed in the container 50. The sockets 60, 62 and 64 are then connected through suitable busses to a single external plug 66 which is connected with an associated socket 68 provided at SDL 22 for the communication between the memory device 18 and the system controller 26. Provided and connected between the sockets 60, 62 and 64 and the external plug 66 is a processor or microcomputer 70 (see FIGS. 4 and 5) for memorizing and recording all the information corresponding a history of the memory device, i.e., the number of connections with SDL 22, a connected time, a disconnected time, a power-on time, a power-off time, temperature, and a status of the device. For this purpose, the microcomputer 70 and the system controller 26 are connected with each other by the connection of the connector 66 and the corresponding socket 68. Additionally, the microcomputer 70 may adapt the SCSI, ATAPI, or Serial ATA interface 54 to other interface specifications suitable for communication with the SDL 22. This allows the number of pins of the plug 66 to be reduced.

Referring to FIGS. 6 to 9, the handler 42 has a housing 72 in the form of box defined with an opening 74 through which the memory device 18 with its container 50 is received therein. A pair of parallel guides 76 are provided adjacent to opposite inner side surfaces of the housing 72, respectively, and extending from the front opening 74 to the rear end of the housing 72 for guiding container 50 into and out of the housing 72. Another guide rails are provided within the housing in a parallel fashion with the container guides 76 for guiding a table 60 to and from the opening 74. The table 80 holds a container! memory device and solenoid 82. Also, the table 80 supports a pair of L-shaped arms 84 on opposite sides of the solenoid 82. One ends 86 of the arms 84 are pivotally connected to a plunger of the solenoid 82. The arms 84 are pivotably supported by respective shafts 88 at their midportions so that the other ends 90 of the arms 84 engage and disengage with associated portions or recesses 92 defined in outer side surfaces of the HI-ID container 50 by the driving of the solenoid 82.

To move the table 80 to and from the opening 74, the table 80 holds a nut 94 which engages with a screw rod 96 supported for rotation about its longitudinal axis by front and rear supports 98 and 100 and drivingly connected to a motor 102. This allows that, by the driving of the motor 102, the screw rod 96 rotates about its longitudinal axis and then advances the table 80 together with the container 50 to and from the opening 74.

The Storage Dock Location (SDL) module provides for the physical SE interface connection for power management, control interface, data interface and parametric data interface to one or multiple storage elements. The storage dock location (SDL) module is controlled by the 5 MM which defines when storage element power is applied, when the control/data interface is connected and to which virtual drive element the control/data interface is connected to. The SDL has power management hardware, SE interface switching hardware and parametric data interface module which allows tracking of mechanical, electrical and statistical data for the storage element.

When picking up the container 50 from the storage shelf 16, a signal is transmitted from the server system 28 to the system controller 26. The system controller 24 drives the pick and place mechanism 30, rotating and S elevating the handler 42 so that the opening 74 of the handler 42 faces to the storage shelf 16 where the aimed container 50 and the memory device 18 is received. Then, the motor 102 is energized, so that the table 80 with the solenoid 82 is transported toward the opening 74. At this moment, the solenoid 82 is de-energized so that the distal ends 90 of the arms 84 spaces away from the container 50 to prevent the physical interference with the container. Subsequently, the solenoid 82 is energized, causing the distal end 90 of the arms 84 to engage with the associated recesses 92 of the container 50. Then the motor 102 is re-energized to move the table 80 away from the opening 74, drawing the container 50 into the housing 72 of the handler 42.

The handler 42 receiving the container 50 is then 20 rotated and, if necessary, moved up or down, facing the container 50 to the aimed SDL 22. In this condition, the motor 102 is energized to force the container 50 into SDL 22, causing the container 50 is mechanically connected with the socket 68 and thereby electrically connected to the system controller 26. This allows the server 28 to record data into the memory device 18 connected with SDL 22 and also retrieve data from the memory device 18. At this moment, data recorded in the microcomputer 70 in the container 50 is retrieved into the system controller 26 for monitoring, updating and maintenance operations.

When disconnecting the container 50 from SDL 22, as described in connection with the operation of receiving the container 50 into the handler 42, the motors 40 and 102 and the solenoid 82 are controlled. The container 50 is received in the handler 42 is then returned into the shelf 16.

In the previous embodiment, the transport mechanism 30 employs the rotating handler 42 and the storage stations 14 and the drive station 20 are provided around the transport mechanism 30. However, as shown in FIG. 9, the storage station 14 may be constructed so that the storage shelves 16 are arranged in the form of matrix. In this instance, the transport mechanism 30 moves vertically and horizontally without rotating.

Of course, the conventional plug and socket connector in which pins of the plug are inserted Into the associated slots or holes defined in the socket can be used for the invention, however; it needs a great force at the connection and disconnection of the plug and socket due to a frictional force which acts on the plug pins. This in turn means that a frequent connection and disconnection damages the plug pins, which reduces a service life of the memory device. For this reason, a spring loaded connector in which one end of each spring biased pin of the plug is brought into contact with a corresponding contact mounted in the socket is preferably used. An example of the spring-loaded connector is commercially available from Mill-Max Mfg., 190 Pine Hollow Road, Oyster Bay, N.Y. 11771.

Figure 9A:
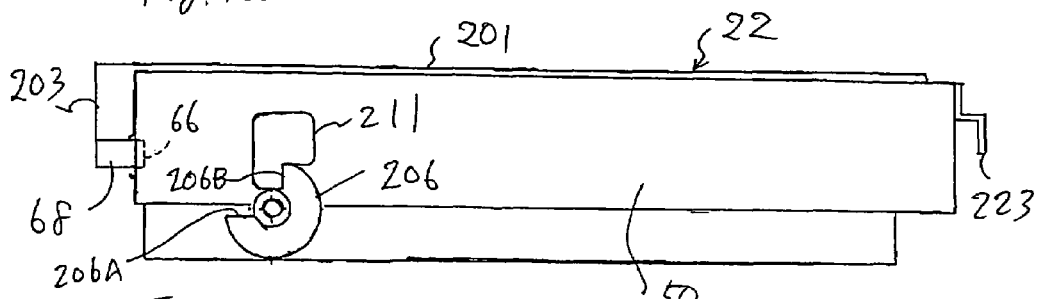
FIGS. 9A and 9B are side elevational views of the container and a housing of SDL for receiving the container.
Figure 9B:
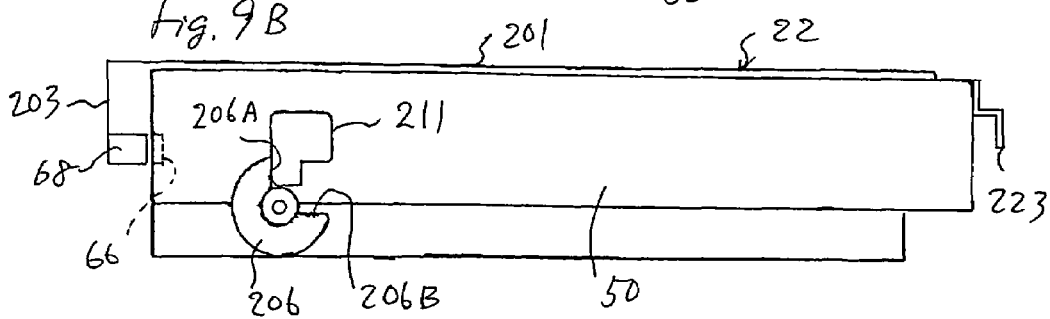
Figure 9C:
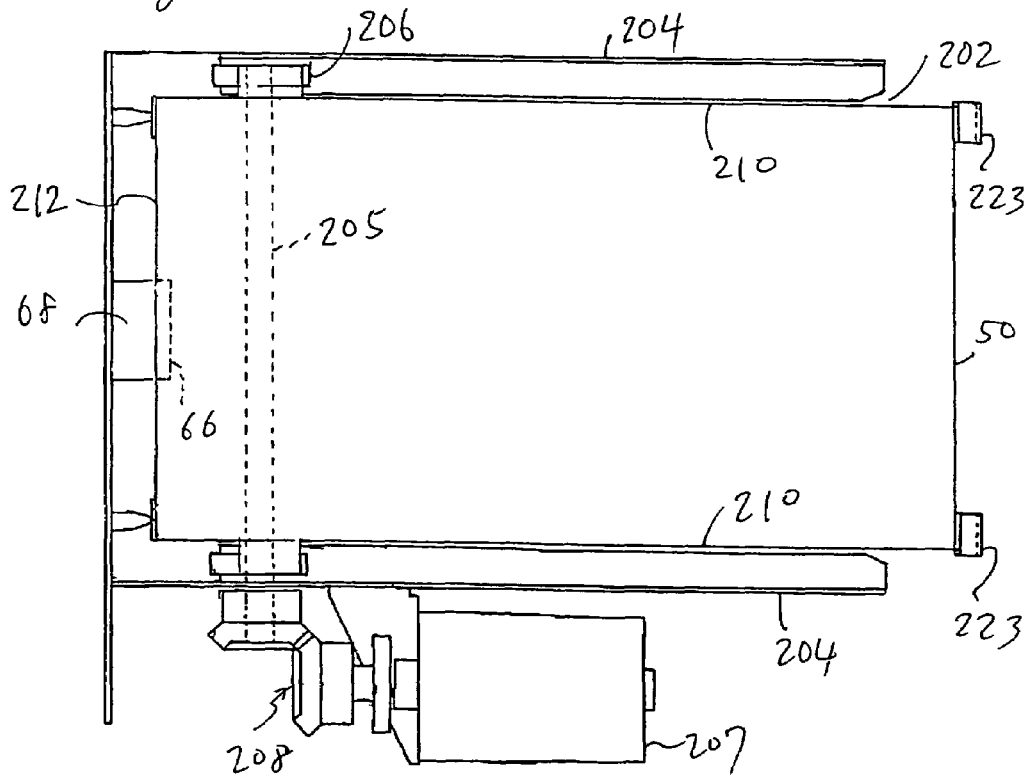
FIG. 9C is a plan view of the container and a housing of SDL for receiving the container.
Figure 19:
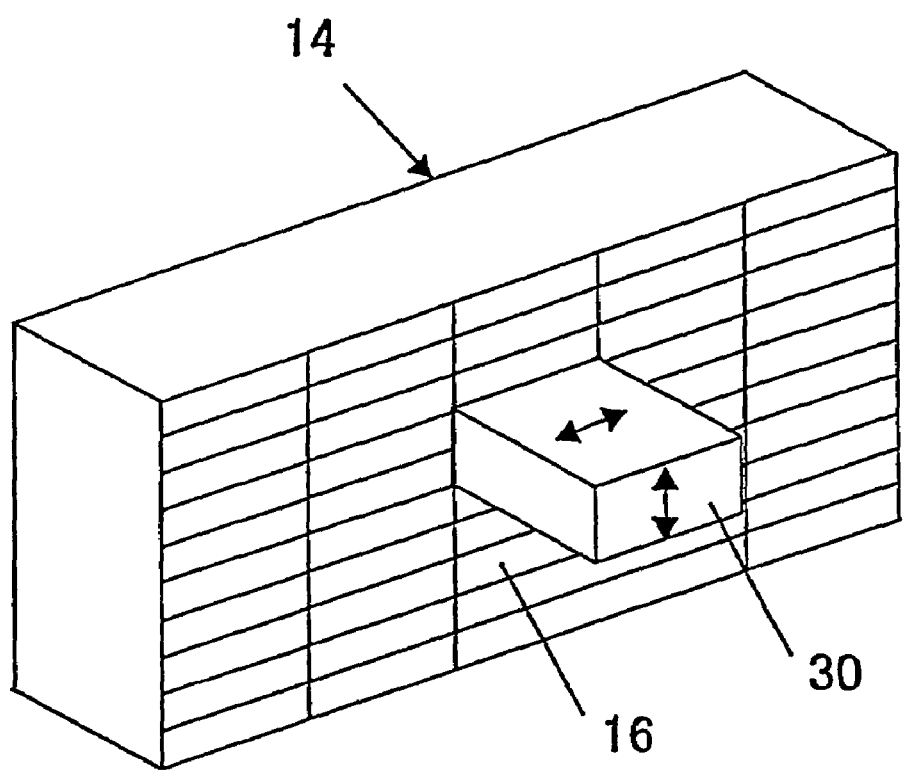
FIG. 19 is a perspective view of another the storage station.

More preferably, the spring-loaded connector is 10 used in combination with an additional mechanism which, when the plug is connected with the socket in SDL, holds the spring-biased pins in contact with the associated contacts in a stable manner. An exemplary embodiment of the mechanism is indicated in FIGS. 9A to 9C. In this embodiment, a housing 201 of SDL 22 for receiving the memory device 18 defines an opening 202 through which the memory device 18 is inserted. Opposing to the opening 202, the housing has an end wall 203 for supporting the socket 68 with an array of fixed contacts and side walls 204 which cooperate with the end wall 203 to define a chamber into which HDD 18 is inserted by the handler 42. The side walls 204 rotatably supports a transverse shaft 205 extending perpendicular to the side walls. The shaft 205 in turn supports a pair of cums 206 in the for of C-ring provided adjacent opposing inner surfaces of the side walls 204 respectively and symmetrically with respect to a direction along which the memory device 18 is moved in and out of the chamber so that upon rotation of the shaft 205 the cums 206 rotate simultaneously. The shaft 205 is mechanically connected with a DC motor 207 through a gear mechanism 208 both secured on one side wall 204 of the housing in this embodiment.

On the other hand, as shown in FIG. 9C a pair of opposing side walls 210 of the container 50 support a pair of projections 211 provided symmetrically with respect to a front-rear longitudinal direction thereof and each having a certain thickness its direction. Also, a front wall 212 of the container SQ supports the plug 66 provided with an array of spring-biased pins and defining a spring-loaded contact in conjunction with the socket 68.

With the arrangement, if no container 50 is received in the chamber of SDL housing 201, as best shown in FIG. 9B the pair of C-shaped cums 206 take respective positions so that each of one circumferential end surfaces 206A of the cums 206 faces the opening 202 of the housing 201. Therefore, when the container 50 accommodating the memory device therein is inserted into the chamber of the SDL housing 201, the projections 211 of the container 50 engage with the surfaces 206A of cums 206. Then, the motor 207 starts driving to rotate the shaft 205 and the cums 206 in the counterclockwise direction in FIGS. 9A and 9B. This causes the one circumferential ends 206A leave from the front end surfaces of the projections 211 and, instead, as shown in FIG. 9B the other circumferential ends 206B of the cums 206 bring into contact with the rear end surfaces of the projections 211 to move the projections 211 as well as the container 50 forward, i.e., toward the end wall 203 of the housing 201. This causes the spring-biased pins of the plug 66 to be brought and held in contact with the associated fixed contacts of the sockets 68.

When retrieving the container 50 from the SDL housing 201, the motor 207 is energized to rotate the cums 206 from one position indicated in FIG. 9A to the other position indicated in FIG. 9B, causing the projections 211 and the container 50 to move rearward and thereby break the connection between the plug 66 and the socket 68. Subsequently, the container 50 is pulled out of the chamber of the housing 201 by the handler 42.

The arms 84 of the handler 42 are pivotally 20 supported in the previous embodiment, however; they may be supported to move transversely. In this modification, as shown in FIGS. ~10 to 13. two drive mechanisms including solenoids 82, for example, are provided on opposite sides of the handler 42. Each solenoid 82 is connected at its plunger with the arm 84 so that, by the driving of the solenoids, the arms 84 moves transversely in opposite directions to hold the rear end of the container 50.

Although the arms are rotatably or movably supported in the previous embodiments, they may be secured on a sliding member of the handler. In this modification shown in FIGS. 14 to 17, a slider 220 is connected through the nut 94 to the screw rod 96 so that it moves back and forth along the screw rod 96. The slider 220 has a pair of lower hooks (first hooks) 221 each extending upwardly. Also, the handler 42 has fixed guide rails 222 for supporting the container 50. The container 50, on the other hand, has a pair of upper hooks (second hooks) 223 (see FIGS. 9A-9C) extending downwardly and capable of being engaged with the lower hooks 221 of the handler 42.

In operation for the transfer of the container between the handler and the storing location (shelf)/the storage docking location (SDL), as shown in FIG. 18A the handler 42 moves upward or downward to a position slightly lower than the container 50 to be pulled out and stored in the storing location (shelf)/the storage docking location (SDL). Then, as shown in FIG. 18B the slider 220 moves toward the stored container 50 so that the lower hook 221 positioned below the upper hook 223. Subsequently, as shown in FIG. 18C the handler 42 moves up so that the lower hook 221 engages with the upper hook 223. Finally, as shown in FIGS. 18D and 18E the slider moves backward to pull the container 50 out of the storing location (shelf)/the storage docking location (SDL) along and on the guide rails 222.

The container 50 supported on the handler 42 is then transported by the upward or downward movement of the handler to a position confronting to the shelf or housing where it will be received Then, as shown in FIGS. 18E and then 18D the container 50 is forced into the shelf or housing by the forward movement of the slider 220. Subsequently, as shown in FIG. 18C and then 18B the handler 42 moves downward so that the lower hook 221 of the handler 42 breaks the engagement with the upper hook 223 at the container 50. Preferably the container 50 is then slight moved forward by the cum mechanism which is discussed with reference to FIGS. 9A to 9C, so that the plug is securely connected with the associated socket.

As described above, this modification allows that structure of the handler 42, in particular the mechanism for holding the container, to be simplified significantly.

II. Automated Disk Management (ADM) System

Figure 20A:
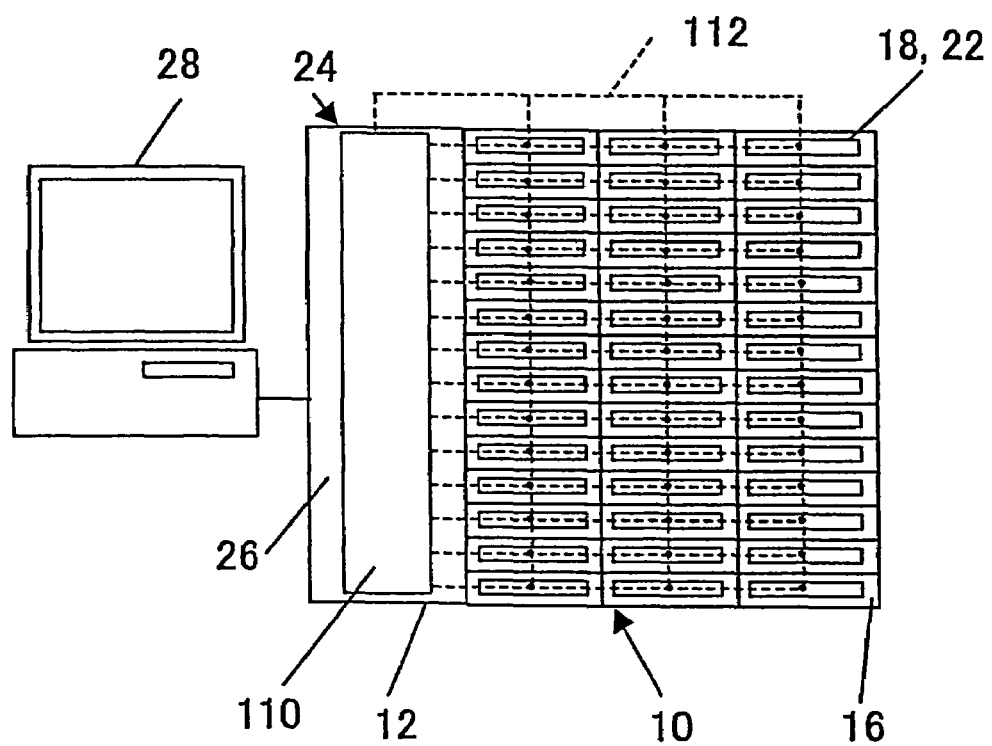
FIG. 20A is another side elevational view of the data storage system of the present invention.
Figure 20B:
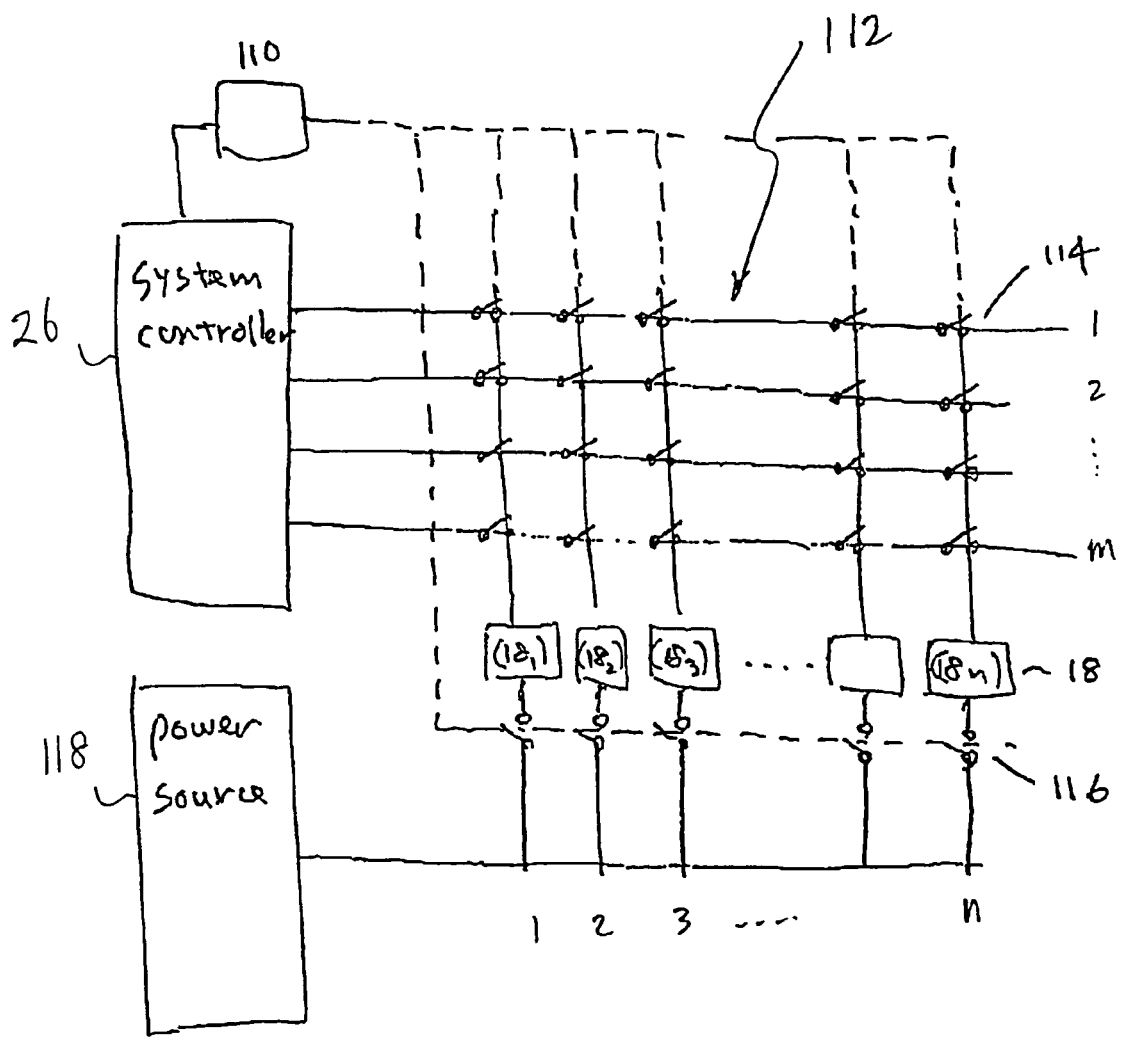
FIG. 20B is a circuit diagram of an automated 5 disk management system including a matrix switch for an electric connection between system controller and the memory devices.

FIG. 20A shows an automated disk management system of the present invention, generally indicated by reference numeral 20A. The disk management system (ADM) 20A differs from the above-described RAID system in several aspects. Specifically, although memory device (HDDs) in the RAD system are removably stored in the storage station so that they can be transported to and from the storage docking station by the pick and place mechanism, i.e., handler, memory devices in this disk management system are secured in the storage location so that each of which is selectively powered and connected with the system controller 26 for the recording and retrieving of date, as required, without being transported. For this purpose, as shown in FIG. 20B a switching controller 110 is provided in order to selectively energize one or more memory devices 18 ($18_1$-$18n$) (n: the number of memory devices). Also, a switching station 112 is provided which includes first switches 114 each connected with the interface connector 54 and the auxiliary connector 58 (see FIG. 4) of the associated memory device 18 for the data transmission between the memory device 16 and the system controller 26 and the second switches 116 each connected with the power connector 56 (also see FIG. 4) of the associated memory device 18 for supplying an electric power from a power source 118 to memory device. Preferably, the switches 114 is constituted by an m by n matrix switch in which selected any cross pints in row channel and column channel are turned on, allowing the associated m memory devices in different column lines are connected with the system controller and the power supply.

In operation in which data is recorded in or retrieved from one selected memory device 18, the system controller 26 transmits a signal to the switching controller 110. In response to the signal, the switching controller 110 turns on the associated switches 114 and 116 corresponding to the selected memory device 18. This results in that the system controller 26 is electrically connected with the memory device 18 and thereby data is recorded in or retrieved from the selected memory device 18 in response to the instruction from the system controller 26 as required.

Figure 20C:
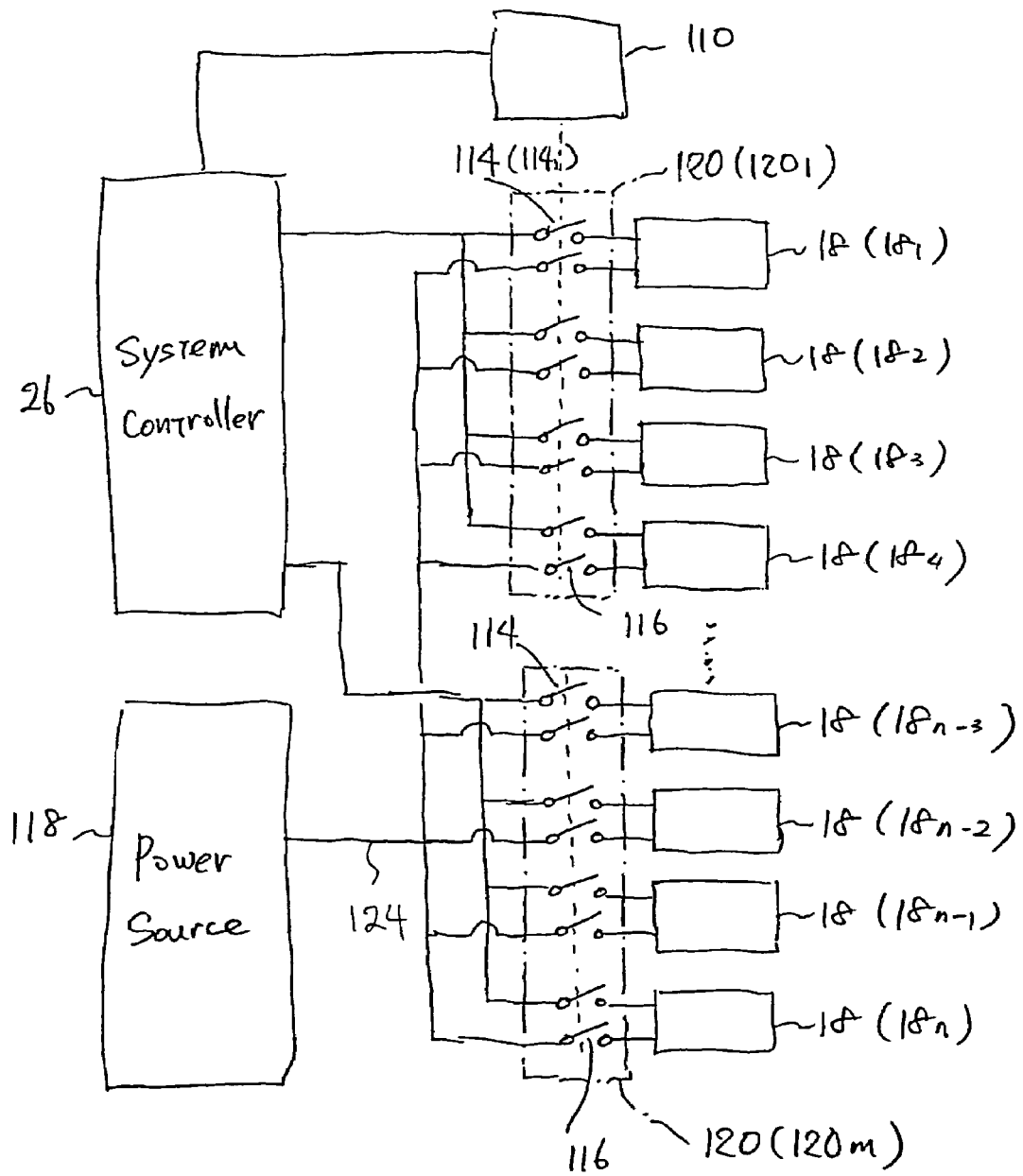
FIG. 20C is a circuit diagram of an automated disk management system including another an electric connection between the system controller and the memory devices.

FIG. 20C shows another embodiment of the disk 15 management system in which the memory devices 18 are divided into a certain number of groups or banks, for example, m banks. For example, each bank may have four memory devices 19 (i.e., n/m=4) In this instance, the system includes m banks (switching stations) 120 each having four first switches 114 for data communication and four second switches 116 for power communication. The first switches 114 in each bank 120 are connected with the interface connectors 54 and the auxiliary connectors 59 (see FIG. 4) of the associated memory devices 18 in the corresponding group and with the system controller 26 through a single communication channel 122. Also, the second switches 116 in each bank 120 are connected with the power connectors 56 (also see FIG. 4) of the associated memory devices 18 and with the power source 118 though a single power channel 124. Further the switching controller 110 is provided between and connected with the system controller 26 and the banks 120 so that the switching controller 110 selectively switches on and off the first and second switches, 114 and 116, independently.

In operation for recording and retrieving data, the system controller 26 transmits a signal to the switching controller 110. In response to the signal, the switching controller 110 turns on the selected one first switch 114 and the corresponding second switch 116 in each bank 120. This results in that the system controller 26 is electrically connected with the selected memory device 18 so that data is recorded in or retrieved from the memory device 18.

It should be noted that the plurality of first 20 switches in one bank are connected with the system controller through the single communication channel. Therefore, in operation only one selected first switch is turned on so that data is transmitted through the selected first switch only between the system controller and the memory device connected with the selected switch. Contrary to this, two or more second switches in one bank may be turned on so that they are simultaneously supplied with electric power.

Figure 20D:
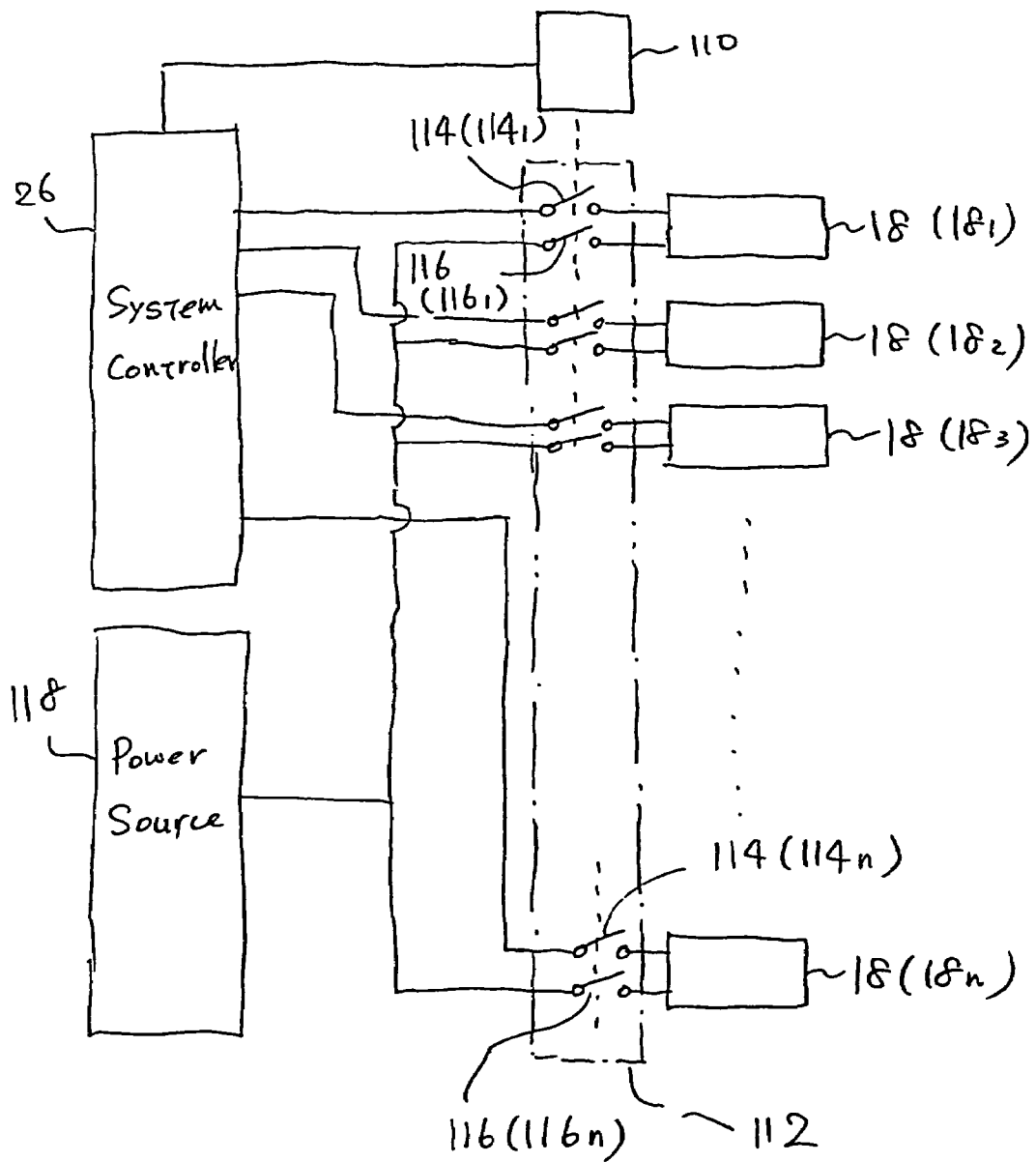
FIG. 20D is a circuit diagram of an automated disk management system including another electric connection between the system controller and the memory devices.

FIG. 20D shows another embodiment of the disk 5 management system in which each memory device is connected through a corresponding first switch 114 and a communication channel to the system controller. With this arrangement, each pair of the first and second switches, 114 and 116, is turned on and off independently.

Figure 20E:
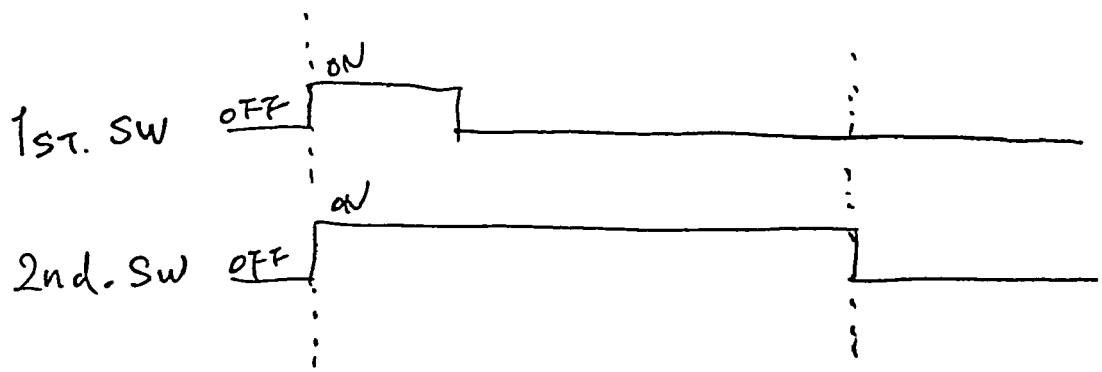
FIG. 20E is a time chart showing an on/off timing of the switches.

In the previous embodiments, as shown in FIG. 20E the switching controller 110 operates so that the second switch is turned on while the first switch is turned on and is turned off a certain time delay after the first switch has been turned off. In this instance, if the first switch is turned on in the delay time, no switching operation (turn-on operation) is needed for the second switch, which extends a durability of the memory device. Furthermore, the first switch can be turned on while the second switch is turned off.

Further, although each of the previous embodiments includes the switching controller 110 is provided for turning on and off the switches, typically mechanical or electronic switches, memory devices may be turned on and off by a signal or packet transmitted from the system controller. In this instance, the packet includes a certain address identifying the memory device (HDD) to be energized.

Furthermore, in this ADM system as well as the RAID system, at least one of memory devices may be used as a spare so that data stored in one or more memory devices can be stored for safe.

III. Logical Structure of System Controller a. General Concept

The above-described RAD/ADM system of the present invention is design based upon the conventional ASACA AM Series library concept and includes a series of columns of storage shelves (SS) 14 for receiving a number of memory device containers.

In the RAD system, the central pick and place mechanism 30 is used for transporting each addressed storage element (SE) or memory device 18 from its shelf 14 to the centralized interface area 20 or power/communication interface location for data reading/writing of memory device. At the interface area 22 the storage element (SE) is powered up, allowing data to be written therein and retrieved therefrom. Preferably, SDL resides in the same plane as and adjacent to storage shelves (SS), allowing the pick and place mechanism to perform the pick and place operation in a short time, minimizing a time necessary for data reading and retrieving.

Figure 21:
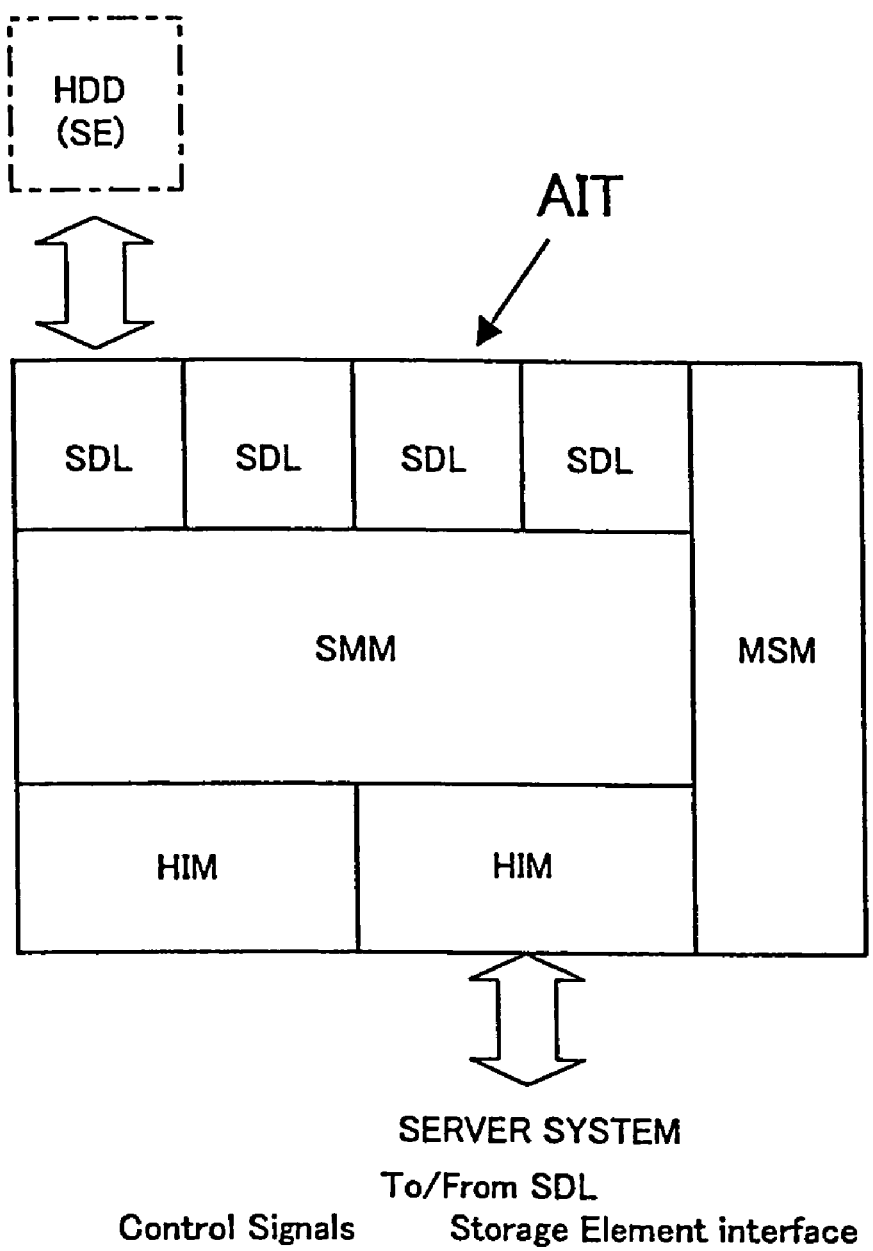
FIG. 21 is a block diagram showing a logical construction of a system controller.

To enable communication with a host computer system or server system, as shown in FIG. 21 the system controller includes an active interface translation (AIT) of interfaces between the storage element (SE) placed in the dock location (SDL) and the host computer system, which will be discussed in more in detail hereinafter.

Consistent with the AM Series library concept, a series of control and status circuits are used to monitor the pick and place operation of the storage elements (SE) from the storage shelf (SS) to the storage docking location (SDL) and also switching operation of the first and second switches. There may be a multiplicity of docking locations (SDLs) within any single PAD/ADM system. Of specific importance is the system controller which is primarily responsible for the overall interpretation and coordination of storage element movement and connection to the storage docking locations (SDL). The storage element (SE) movement for docking/undocking from the dock location (SDL) or switching operation can be initiated by the AIT system or communication derived from a host computer with the system controller through one or more communication interfaces.

The ability to attach multiple RAD cabinets into a single system is supported with the ability to use a pass through mechanism (PT) allowing SE to be moved from one cabinet to another. The pass through mechanism (PT) is fully described in the U.S. Pat. No. 6,09'3,322 issued to Asaca Corporation, which is incorporated herein in its entirety by reference. This ability to create the extended RAP system provides for system expandability while maintaining the ability to access available SDLs in adjacent cabinets, improving system availability and data I/O. The pass through mechanism (PT) is controlled by the system controller within the cabinet in which the pass through mechanism (PT) is contained. Overall coordination of the movement of SE's within cabinets to SDLs is managed by the system controllers in the cabinets in which the SE element will pass, which is fully described in the U.S. Pat. No. 6,094,322 issued to Asaca Corporation, the content of which being incorporated herein in its entirety by reference.

b. Active Interface Translation (AIT)

The AIT element interfaces and translates between 20 the SE interface and the host system communication interface. Host systems can communicate to storage devices over various types of interfaces including, but not limited to, SCSI (Small Computer System Interface), Fibre Channel, Infiniband, IDE (Integrated Drive Electronics), Ethernet, TCP/IP (Transmission Control Protocol/Internet Protocol), USB (Universal Serial Bus), Fire Wire, etc. In addition, storage elements (SE) communicate over various types of interfaces including, but not limited to, SCSI, Fibre Channel, IDE, Serial ATA, USB, Fire Wire, etc. Each of those interfaces is designed and expected by the host system to maintain the presence of the SE communication during the normal operational span of the host system from startup to shutdown. The ALT element must provide the host system with a virtual presence of the SE over the established communication interface of the host, while allowing the movement/switching of the SE within the RAD/ADM system including the docking/switching, power up, data read/write, power down and undocking of the SE element.

Figure 22:
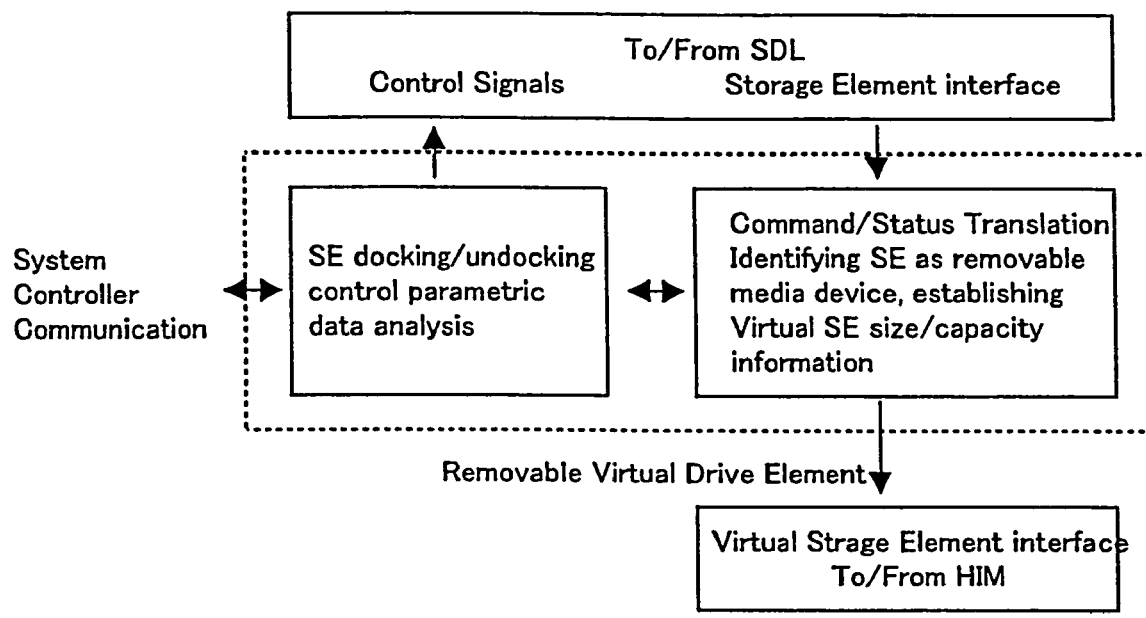
FIG. 22 is a block diagram showing the logical structure of a Virtual Drive element.
Figure 23:
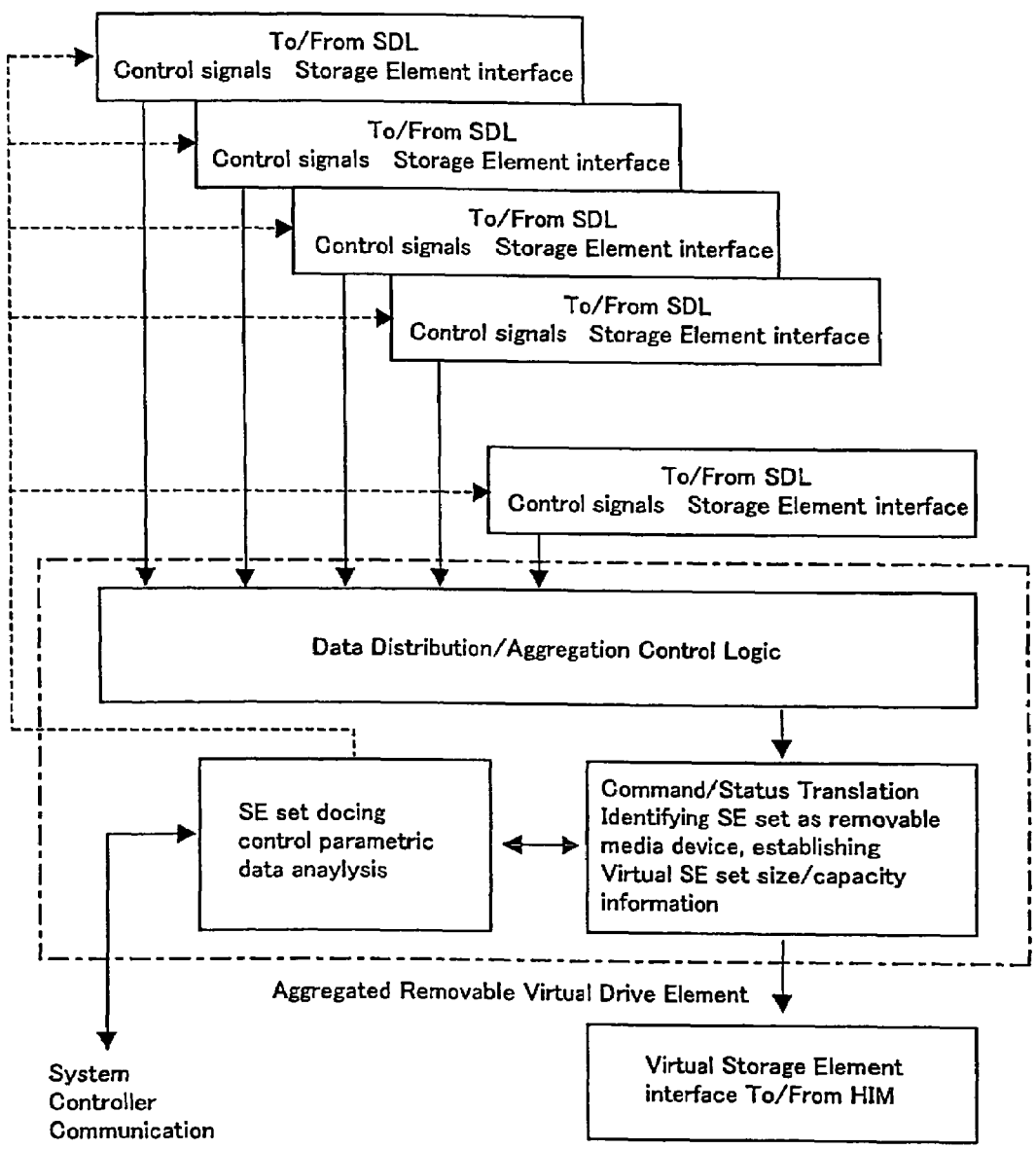
FIG. 23 is a block diagram showing the logical structure of an aggregated removable virtual drive element.

The virtual presence of the SE element created by 15 the AIT element may involve actual translation from one specific SE interface type to a distinctly different host interface type, or may involve creation of the virtual presence from the same SE interface to a like host. interface. Specific implementation of the SE interface type is dependent on the type of SDT module installed in the RAD system. Specific implementation of the host interface type is dependant on the type of host interface module (HIM) installed in the AIT element. Additionally, the AIT module may allow for more than one host interface module (HIM) type, or multiple instances of any one host interface module (HIM). In addition to the actual translation of interface types between the SE and host, logical translation of data may also occur in the Storage Mapping Module (SMM) of the AIT element. The overall outline of the AIT element is defined in FIG. 21. Specific implementation currently utilizes either SCSI, Fibre Channel Serial ATA or IDE SDL modules with either SCSI, Fibre Channel, Ethernet TCP/IP HIM's. The Storage Mapping Module (SMM) provides the virtual presence of the SE attachment to the host system in one of several manners:

(1) Removable Media Type:

In this instance the SMM intercepts communication between the HIM and SDL modules, modifies the normal storage element responses, and identifies to the host system that the virtual drive attached contains removable media. In this case the host system then treats the virtual drive as having media which can be injected/ejected either manually or by automated means. In this instance the data component is not altered between the HIM and SDUSE. When the system controller docks/undocks/switches the storage element SE, it will report manual inject/ejection of the media while maintaining the virtual presence of the drive element. When the host system ejects/injects media through the HIM, the SMM communicates the need for SE undocking/docking/switching to the system controller. This instance of the SMM creates just a bunch of disk's (JBOD) environment where the host views each virtual disk as having multiple removable pieces of media. Example of removable media type SMM is given in FIG. 22.

(2) Aggregated Removable Media Type:

In this instance the SMM intercepts communication between the HIM and SDL modules and modifies the data distribution in addition to the normal storage element responses, identifying to the host system that the virtual drive attached contains removable media. This also aggregates the storage capacity of multiple SE together, increasing the effective storage capacity/reliability of the virtual drive to the host system. In this case the host system then treats the virtual drive as having media which can be injected/ejected either manually or by automated means. When the System Controller docks/undocks/switches the storage element SE, it will report manual inject/ejection of the media while maintaining the virtual presence of the drive element to the host only when no other viable SE or SE set is still docked in other SDL modules. When the host system ejects/injects media through HIM, SMM communicates the need for all of the currently docked/undocked/switched SE undocking/docking/switching to the system controller. In the event that a data access is made by the host system on the virtual drive which data is not currently available from currently docked/switched SE in the virtual drive set, SMM communicates the need for the correct SE containing the requested data to be docked into an SDL or to be switched by the system controller prior to the actual data being returned to the host system. This instance of SMM creates virtual disks which can contain multiple aggregated SE and allows for dynamic extensions of the virtual disk by adding additional SE to the virtual drive set through any of the HIMs. Additionally, data may be aggregated across multiple docked SE simultaneously, thereby increasing the total virtual drive data transfer rate and or data reliability when combined with parity data as in a Redundant Array of Independent Disks (RAID) system.

Figure 24:
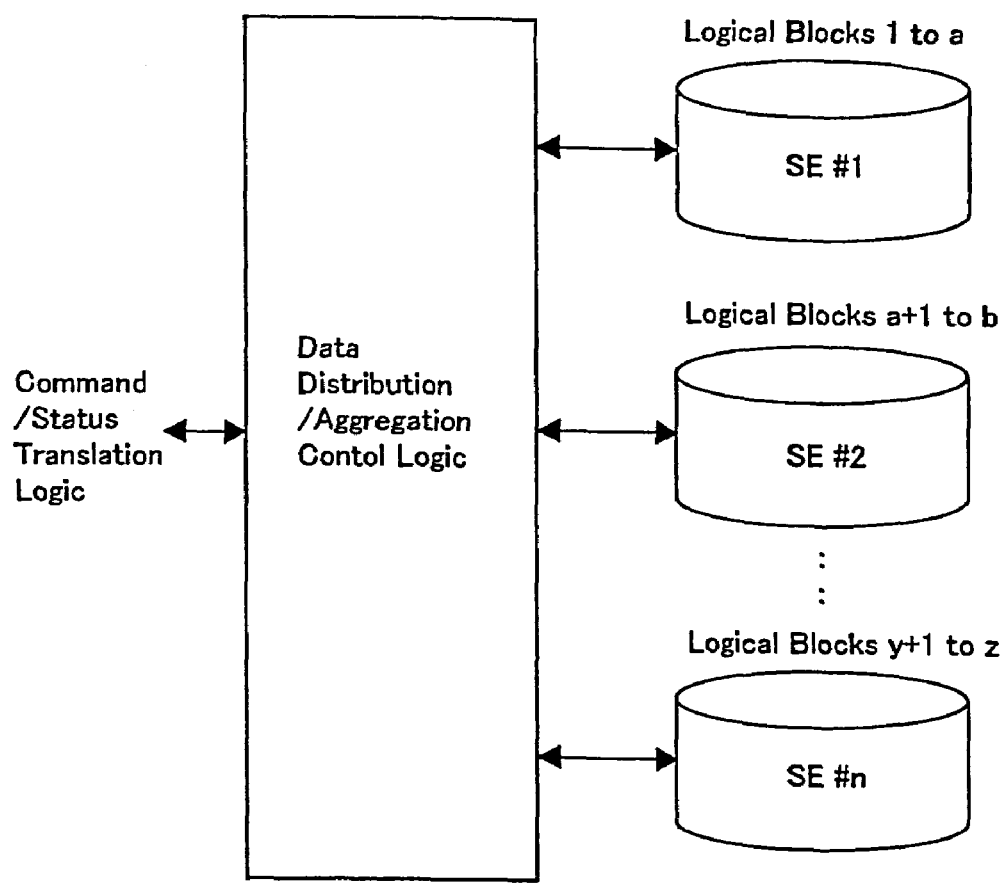
FIG. 24 is a block diagram showing the logical 25 implementation of multiple disk aggregation.

Using the aggregation mode of SMM, various forms of data distribution/aggregation can be accomplished as follows:

(a) Extensibility of Storage Elements (See FIG. 24)

In this mode the capacity of a single SE can be combined with additional capacity of other SE's in a linear fashion. Thus as new capacity is required on a virtual disk element, additional SE can be added providing growth of the virtual drive size. Also, multiple SEs can be used with either all SEs docked/switched at the same time, or using less than n docking locations or switching stations with the SIAM loading/unloading/switching SE as required to complete requests from the host system. If less than n SEs are docked/switched, performance for read/write operations will be delayed during the SE load/unload/switch cycles.

Figure 25:
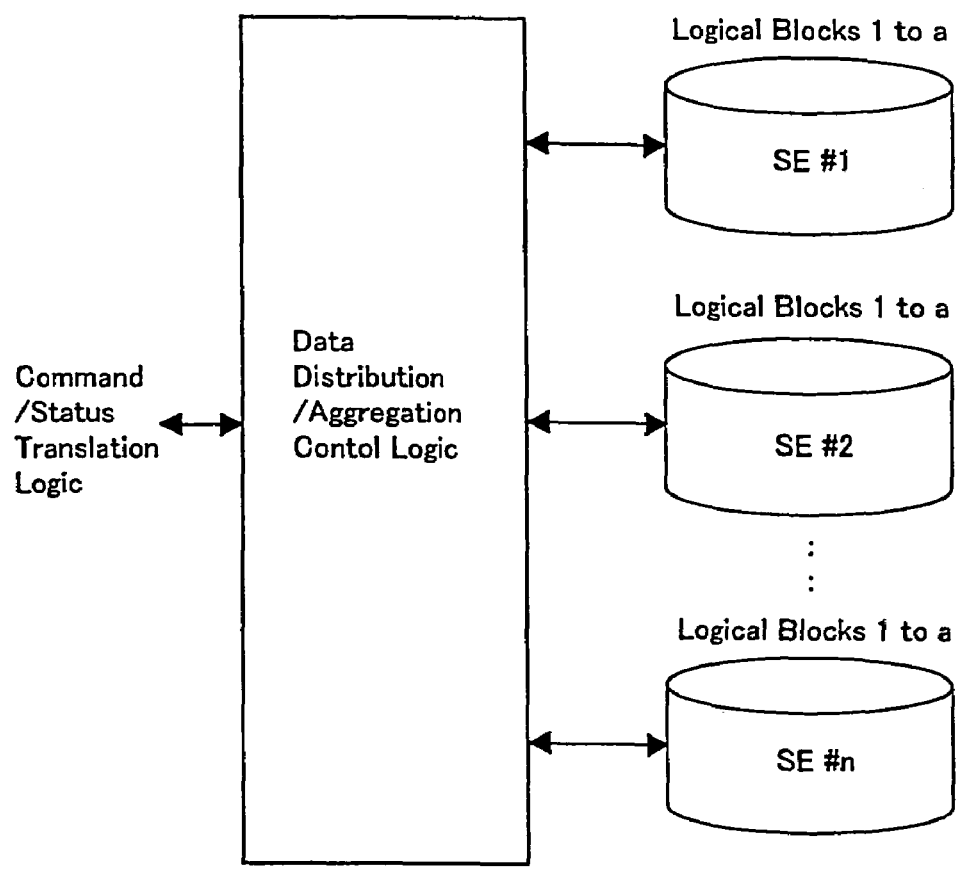
FIG. 25 is a block diagram showing the logical implementation of multiple disk mirroring.
Figure 26:
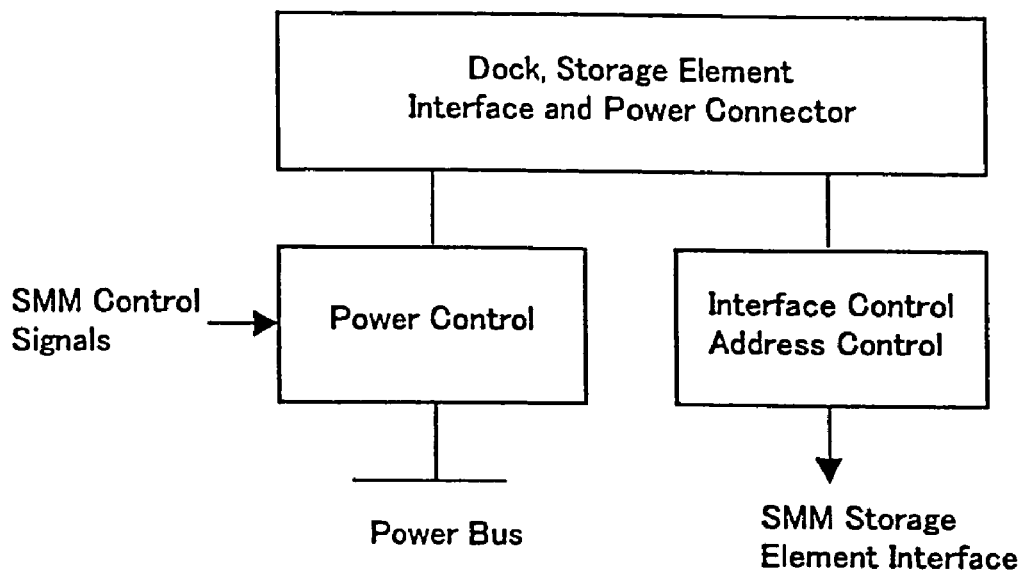
FIG. 26 is a block diagram showing the logical structure of a Storage Docking Location.

(b) Redundant Storage Elements (See FIG. 25)

In this mode two or more SE's are used with the data distribution/aggregation logic duplicating the data across the SE's thereby creating a secondary copy (mirror) of the data. In the event one SE is damaged or removed, valid read/write data can still be obtained. The effective capacity of the virtual disk is the same as a single SE element.

(c) Storage Dock Location (SDL)

The Storage Dock Location module (SDL) provides for the physical SE interface connection for power management, control interface, data interface and parametric data interface to one or multiple SE's. The storage dock location module (SDL) is controlled by the SMM which defines when SE power is applied, when the control/data interface is connected and to which virtual drive element the control/datainterface is connected to. The SDL consists of power management hardware, SE interface switching hardware and parametric data interface module which allows tracking of mechanical, electrical and statistical data for the SE.

Each dock location is an active storage shelf 5 (SS) with independent power control electronics and interface switching to allow for drive element docking/undocking and switching without interfering with the Storage Mapping Module (SMM) operation by active interface control. A logical outline of multiple docking locations is given in FIG. 28.

The parametric electronics allows for identification, parametric monitoring (temperature, power on hours, docking cycles, element statistics, etc.) and information storage apart from but attached to the Storage Element. By providing a separate data path for parametric data, the interface control and 5MM can identify and properly control/connect the Storage Element prior to power application.

(d) Host Interface Module (HIM)

The Host Interface Module (HIM) provides for the physical interface from the BAD system to one or more host systems. One or more HIM may be contained in a RAD/ADIA system. HIM's may be, but not limited to SCSI (Small Computer System Interface), Fibre Channel, Infiniband, IDE (Integrated Drive Electronics), Ethernet, TCP/IP (Transmission Control Protocol/Internet Protocol), USB (Universal Serial Bus), Fire Wire, etc.

(e) Maintenance Storage Module (MSM)

The Maintenance Storage Module (MSM) provides for monitor and tracking of SE's for long term archival reliability and redundancy. This module maintains the management data required to identify SE which require maintenance operations as a result of mechanical aging, predictable data degradation (S.M.A.R.T. technology), predictable mechanical degradation (MTTF), RAID reconstruction and scheduled data migration. The MSM will request SE or SE set docking/undocking/switching during specified maintenance intervals and automatically perform the required maintenance events without host system intervention. During MSM operations availability of SDLs/switched memory devices such as HDDs is limited based on the maximum limits established for maintenance operations. As a result the ability for a host system to inject/eject a virtual drive with media during the maintenance operation utilizing some SDLs/switched memory devices host mounting may be limited. Even in the event of limited SDLs/switched memory devices the virtual presence of the drive to the host system is not affected and the drive can show no media present.

The MSM is expected to have extensive capability that develops over the life of the product. It is also expected that the MSI4 will manage most of the virtual drive set definitions for SE's. Depending on the exact hardware implementation of the SMM the capability of the MSM will be established.

(f) Others

The definition of the RAD/ADM system so far has been focused on block type I/O to the storage elements as would be defined by a block structured virtual disk. Additional features can be included in the base hardware architecture such as file level I/O as in the case of Network Attached Storage systems. Further, a hybrid hierarchical system could be constructed utilizing ASACA's DVD-RAM product line and/or Tape libraries to create stand alone block/file oriented HSM systems. Since the basic terminology defined above does not distinguish the SE type, it is possible to implement this concept in Hard Disk, Optical Disk, Tape, or other new technology.

With the creation of the RAD/ADM system it is also possible to utilize the embedded SIAM capability to perform multiple RAD/ADM system synchronization over a data channel with suitable bandwidth. Particularly with the utilization of iSCSI protocol, simple RAD/ADM system mirroring or migration policies could be implemented.

The unique capability to switch out data sets (JBOD or RAID style) allows for rapid reconfiguration in data environments. For example, a 120 GB JBOD SE takes 60 seconds to unload, exchange, reload a second SE, the effective transfer rate to upload/download that amount of data would be effectively 4 GB/s transfer rate. This performance per SE is exceptional and unparalleled in the industry. This capability coupled with an imbedded mirroring technology allows for instantaneous and hot backup with one mirror component being removable for off site disaster recovery. Further, a secondary mirror set could be loaded and re-synchronized to the primary data set as a MSM activity during low I/O bandwidth cycles of the host system.

CONCLUSION

As can be seen from above, the data storage 20 system of the present invention, the electric power is not supplied to all of memory devices in the system, but only to that or those in the docking locations or switching station. Therefore, the power consumption can be reduced considerably, which in turn reduces a heat generation of the system. Additionally, life span of the storage element is dramatically increased by limiting the power on hours to those where data I/O occur. As a result, MTTF of 2 years for a typical memory device can be extended from between 4-20 years depending on the I/O duty cycle and the power on limiting the RAD system performs. As a result of the overall power reductions robotic automation, switching, life cycle expansion, high speed random accessible storage can be utilized for near line and long term archival data. Data grooming, duplication, predictive error management can be performed by the MSM to further increase the life span of data stored in the RAD/ADM system.

What is claimed is:

1. A data storage system, comprising:
one or more memory devices;
a system controller each connected with the memory devices through respective first switches for data transmission;
a power source connected with the memory devices through respective second switches; and
a switching controller for switching on and off the first and second switches; and
an active interface translation element (AIT) which provides logical switching and electrical switching of data interfaces from a switching station through a virtual drive logical element to a host interface element (HIM).

2. The data storage system of claim 1, wherein the active interface translation element (AIT) includes a virtual drive element which creates an appearance of a logical disk drive element to a host server system through a host interface element (HIM).

3. The data storage system of claim 1, wherein the AIT element includes a maintenance module (MSM) which provides a monitoring of the memory device for predicting a failure of the memory device and executing operations required to minimize data loss and maintain integrity of the memory device.

4. The data storage system of claim 2, wherein the active interface translation element (AIT) includes a host system with a virtual presence of a storage element over an established communication interface of the host system while allowing a switching of the storage element within the storage system, including power up, data read/write, and power down of the storage element.

5. The data storage system of claim 2, wherein the active interface translation element (AIT) provides a virtual presence of a storage element even when the storage element is powered down.

* * * * *